United States Patent
Tanaka et al.

(10) Patent No.: US 8,891,113 B2
(45) Date of Patent: Nov. 18, 2014

(54) IMAGE FORMING APPARATUS, DATA PROCESSING PROGRAM, DATA PROCESSING METHOD, AND ELECTRONIC PEN

(75) Inventors: Yoshinori Tanaka, Koganei (JP); Koji Shakushi, Hachioji (JP); Mitsuru Okuzawa, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 348 days.

(21) Appl. No.: 13/269,437

(22) Filed: Oct. 7, 2011

(65) Prior Publication Data
US 2012/0099147 A1    Apr. 26, 2012

(30) Foreign Application Priority Data

Oct. 21, 2010 (JP) ................................ 2010-236357
Feb. 17, 2011 (JP) ................................ 2011-031639

(51) Int. Cl.
*G06K 9/22* (2006.01)
*G06F 3/12* (2006.01)
*H04N 1/04* (2006.01)

(52) U.S. Cl.
CPC ............ *G06F 3/1206* (2013.01); *G06F 3/1247* (2013.01); *G06F 3/1228* (2013.01); *G06K 9/222* (2013.01); *G06F 3/1248* (2013.01); *G06F 3/128* (2013.01)
USPC .......... 358/1.15; 358/478; 358/477; 358/474; 358/1.16; 358/1.13; 382/314; 382/313; 382/312; 345/179

(58) Field of Classification Search
CPC . G06F 3/0317; G06F 3/0321; G06F 3/03545; G06F 3/042; G06F 3/0433; G06F 3/1248; G06F 3/128; G06F 3/1247; G06F 3/1206; G06F 3/1228; G06K 1/121; G06K 9/222; G06K 9/24; G06K 9/22; G06K 9/228; G06K 2009/22; G06K 2009/226
USPC ........ 382/186, 187, 312–314; 358/1.11–1.18, 358/474–478; 178/18.01, 19.01; 341/5; 345/179–183
See application file for complete search history.

(56) References Cited

U.S. PATENT DOCUMENTS 8,577,148 B2 * 11/2013 Fujiwara ........................ 382/186
2002/0065853 A1 * 5/2002 Takahashi et al. ............ 707/527
(Continued)

FOREIGN PATENT DOCUMENTS

JP    2006-163952    6/2006
JP    2006-268758    10/2006
(Continued)

OTHER PUBLICATIONS

Notice of Reasons for Refusal from JPO for appl. No. 2011-031639, drafted Feb. 14, 2014, 3 pgs.
(Continued)

*Primary Examiner* — Chad Dickerson
(74) *Attorney, Agent, or Firm* — Squire Patton Boggs (US) LLP

(57) ABSTRACT

An image forming apparatus capable of communicating with an electronic pen at least includes a communication section for obtaining, from the electronic pen, electronic pen data including multiple pieces of position information obtained by detecting a position detection mark printed on a hand-writing sheet by the use of the electronic pen; a language analysis section for analyzing the electronic pen data, identifies one or more hand-written images defined by the multiple pieces of position information, and creates intermediate data that defines the arrangement of objects including respective hand-written images; an image processing section for rasterizing the intermediate data to create bitmap data; and a printing section for conducting printing based on the bitmap data.

23 Claims, 20 Drawing Sheets

EXAMPLE OF ELECTRONIC PEN DATA

EXAMPLE OF INTERMEDIATE DATA FORM

(56) References Cited

U.S. PATENT DOCUMENTS

| | | | |
|---|---|---|---|
| 2004/0085301 A1* | 5/2004 | Furukawa et al. | 345/179 |
| 2005/0052700 A1* | 3/2005 | Mackenzie et al. | 358/1.18 |
| 2005/0237312 A1* | 10/2005 | Lapstun et al. | 345/179 |
| 2006/0001932 A1* | 1/2006 | Sekiguchi | 358/537 |
| 2008/0018929 A1* | 1/2008 | Nakamura | 358/1.15 |
| 2008/0239333 A1* | 10/2008 | Ogashiwa | 358/1.4 |
| 2008/0309993 A1* | 12/2008 | McKinley et al. | 358/474 |
| 2009/0268249 A1* | 10/2009 | Ikeda et al. | 358/1.18 |

FOREIGN PATENT DOCUMENTS

| | | | |
|---|---|---|---|
| JP | 2006268758 A | * | 10/2006 |
| JP | 2010-182107 | | 8/2010 |
| JP | 2010182107 A | * | 8/2010 |
| JP | 2010-529916 | | 9/2010 |

OTHER PUBLICATIONS

Translation of the Notice of Reasons for Refusal from JPO for appl. No. 2011-031639, drafted Feb. 14, 2014, 3 pgs.

Notice of Reasons for Refusal from JPO for appl. No. 2010-236357, drafted May 9, 2014, 2 pgs.

Translation of the Notice of Reasons for Refusal from JPO for appl. No. 2010-236357, drafted May 9, 2014, 2 pgs.

* cited by examiner

10: PRINTING SYSTEM

20: ELECTRONIC PEN

30: IMAGE FORMING APPARATUS (COLOR PRINTER)

30: IMAGE FORMING APPARATUS (COLOR MULTIFUNCTIONAL PERIPHERY)

20: ELECTRONIC PEN

ANOTO (REGISTERED MARK) PATTERN

START POINT (X0,Y0)
END POINT (X1,Y1)
COLOR INFORMATION (R,G,B)

EXAMPLE OF
ELECTRONIC PEN DATA

RECTANGLE DATA (X2,Y3)
(X3,Y2)
(X5,Y4)
(X4,Y5)
COLOR INFORMATION (R,G,B)

EXAMPLE OF
INTERMEDIATE DATA FORM

EXAMPLE OF PJL COMMAND INSTRUCTION

```
%-12345X@PJL JOB
@PJL SET RESOLUTION = 600
@PJL SET PAPER = A4
@PJL SET NIN1 = N2
@PJL SET DUPLEX = ON
     •
     •
     •

ELECTRONIC PEN DATA
     •
     •
     •

%-12345X@PJL EOJ
%-12345X
```

FIG. 15

JOB SETTING TABLE

| NAME OF SETTING ITEM | SETTING VALUE |
|---|---|
| PAPER | A4 |
| NIN1 | N2 |
| DUPLEX | ON |

FIG. 16

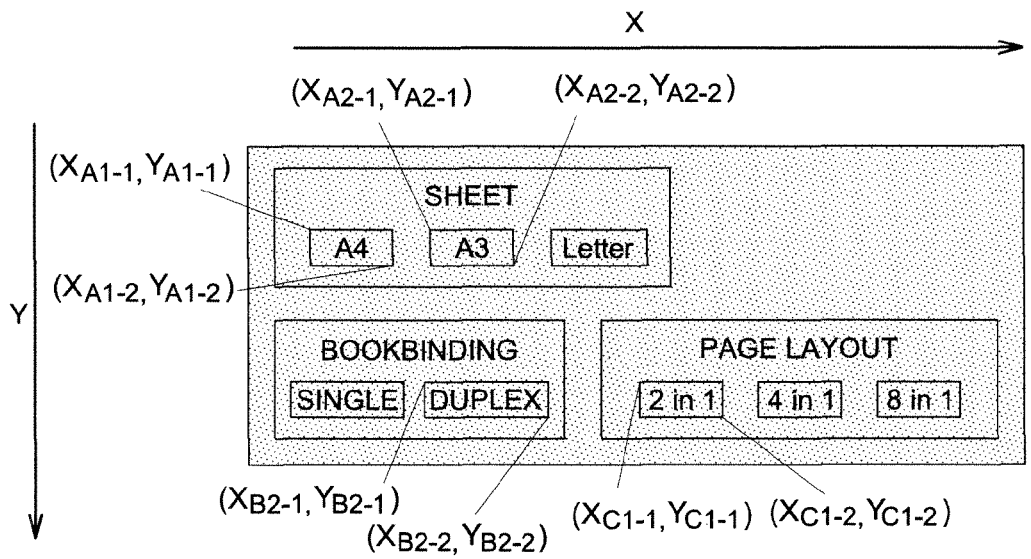

FIG. 17

TABLE FOR ASSOCIATING SETTING ITEM
WITH POSITION INFORMATION

| FUNCTION | OPTION | X Min | X Max | Y Min | Y Max |
|---|---|---|---|---|---|
| SHEET | A4 | $X_{A1-1}$ | $X_{A1-2}$ | $Y_{A1-1}$ | $Y_{A1-2}$ |
|  | A3 | $X_{A2-1}$ | $X_{A2-2}$ | $Y_{A2-1}$ | $Y_{A2-2}$ |
|  | LETTER | $X_{A3-1}$ | $X_{A3-2}$ | $Y_{A3-1}$ | $Y_{A3-2}$ |
| BOOKBINDING | SINGLE | $X_{B1-1}$ | $X_{B1-2}$ | $Y_{B1-1}$ | $Y_{B1-2}$ |
|  | DUPLEX | $X_{B2-1}$ | $X_{B2-2}$ | $Y_{B2-1}$ | $Y_{B2-2}$ |
| PAGE LAYOUT | 2 in 1 | $X_{C1-1}$ | $X_{C1-2}$ | $Y_{C1-1}$ | $Y_{C1-2}$ |
|  | 4 in 1 | $X_{C2-1}$ | $X_{C2-2}$ | $Y_{C2-1}$ | $Y_{C2-2}$ |
|  | 6 in 1 | $X_{C3-1}$ | $X_{C3-2}$ | $Y_{C3-1}$ | $Y_{C3-2}$ |

50: PRINT

IMAGE FORMING APPARATUS, DATA PROCESSING PROGRAM, DATA PROCESSING METHOD, AND ELECTRONIC PEN

This application is based on Japanese Patent Application Nos. 2010-236357 filed on Oct. 21, 2010 and 2011-031639 filed on Feb. 17, 2011 with Japanese Patent Office, the entire content of which is hereby incorporated by reference.

BACKGROUND OF THE INVENTION

The present invention relates to an image forming apparatus and data processing program, a data processing method, and electronic pen. The present invention specifically relates to an image forming apparatus for printing hand-written images by the use of an electronic pen, a data processing program for transforming data outputted from the electronic pen into printable data, a data processing method for printing hand-written images drawn by the use of the electronic pen, and an image forming apparatus and electronic pen and data processing program for executing processing based on the data processing method.

Recently, an electronic pen equipped with a data transmission function has been popular. For example, when an electronic pen is moved across a sheet of paper on which a specific pattern, typically the ANOTO (registered mark) pattern, has been printed, a camera built into the electronic pen reads the specific pattern, detects its position on the sheet, and transmits data (electronic pen data) that indicates the movement locus of the electronic pen to a computer device. Then, the computer device analyzes the electronic pen data by the use of an application program to identify the hand-written image, and instructs the image forming apparatus to print the hand-written image by the use of a printer driver.

A system that uses such an electronic pen is disclosed in, for example, published Unexamined Japanese Patent Application Publication No. 2006-268758. The system is a printing system comprising a digital pen capable of acquiring contents written on a dedicated sheet having a predetermined pattern by regarding the contents as hand-writing information associated with the writing position based on the above pattern, and transmitting the hand-writing information to the outside, and a computer that receives the hand-writing information transmitted by the digital pen, recognizes the written contents and its writing position according to the writing information contained in the hand-writing information, and reflects the written contents in a predetermined file; and the printing system further comprising a printing output means for printing out by using the printing data based on the predetermined file and printing the specific pattern on the sheet thereby printing and outputting the sheet as the dedicated sheet.

In the method as shown in the above published Unexamined Japanese Patent Application Publication No. 2006-268758, wherein electronic pen data is first analyzed by a computer device to obtain a hand-written image and then instructions to print are sent to the image forming apparatus based on the hand-written image, the hand-written image cannot be printed unless there is a computer device, which creates an inconvenient situation. In addition, operation is troublesome because a dedicated application program to analyze electronic pen data and a printer driver must be installed beforehand in each computer device.

SUMMARY

In view of the above problems, main objectives of the present invention are to provide an image forming apparatus and data processing program capable of printing a hand-written image by the use of an electronic pen without using a computer device, and also provide a data processing method capable of easily setting printing conditions to print the hand-written image, as well as to provide an image forming apparatus and electronic pen and data processing program.

To achieve at least one of the above objectives, an image forming apparatus and data processing method reflecting one aspect of the present invention includes the following:

1. An image forming apparatus capable of communicating with an electronic pen, the image forming apparatus including: a communication section for acquiring, from the electronic pen, electronic pen data including a plurality of pieces of position information obtained by detecting a position detection mark printed on a hand-writing sheet by using the electronic pen; a language analysis section which analyzes the electronic pen data, identifies one or more hand-written images specified by the plurality of pieces of position information, and creates intermediate data which specifies arrangement of an object including each of the hand-written images; an image processing section for rasterizing the intermediate data to create bitmap data; and a printing section for conducting printing based on the bitmap data.

2. The image forming apparatus according to Item 1, wherein an area for setting printing condition is allocated beforehand on the hand-writing sheet, the image forming apparatus further including: a storage section for storing a table for associating one or more setting items disposed in the area with position information of the setting items, and wherein when the electronic pen data includes position information of a position in the area, the language analysis section refers to the table, identifies a setting item associated with the position information, and sets the printing condition according to the identified setting item and the printing section conducts printing according to the set printing condition.

3. The image forming apparatus according to Item 1, wherein an area for setting printing condition is allocated beforehand on the hand-writing sheet, and one or more setting items are disposed in the area, the electronic pen includes a function for recognizing a setting item based on the position information of a position in the area, obtained by detecting the position detection mark and adding a printing condition based on the recognized setting item to the electronic pen data and transmitting the data, the language analysis section analyzes the electronic pen data, and identifies the printing condition added to the electronic pen data, and the printing section conducts printing according to the identified printing condition.

4. The image forming apparatus according to Item 3, wherein the printing condition is added to the electronic pen data as a PJL command.

5. A data processing method in a system in which an electronic pen capable of detecting a position detection mark is communicably connected to an image forming apparatus for printing an image drawn by the electronic pen, the data processing method including: a first step of the image forming apparatus printing one hand-writing sheet combined with the position detection mark; a second step of the electronic pen obtaining a plurality of pieces of position information by detecting the position detection mark on the one hand-writing sheet; a third step of the electronic pen or the image forming apparatus which has obtained the plurality of pieces of position information from the electronic pen, picking out position information relating to setting of a printing condition from the plurality of pieces of position information and setting the printing condition based on the picked-out position information; and a fourth step of the image forming apparatus transforming, into intermediate data, information of a movement locus of the electronic pen specified by position information other than the position information relating to the setting of the printing condition, rasterizing the intermediate data to create bitmap data, and printing an image based on the bitmap data on a printing sheet according to the set printing condition.

6. The data processing method according to Item 5, wherein the position information relating to the setting of the printing condition is position information of a position in an area allocated beforehand to the hand-writing sheet, in the first step, the image forming apparatus creates a table for associating one or more setting items disposed in the area of the hand-writing sheet with position information of the setting items, and in the third step, the electronic pen which has obtained the table from the image forming apparatus or the image forming apparatus picks out position information of a position in the area from the plurality of pieces of position information, refers to the table, identifies a setting item associated with the picked-out position information, and sets the printing condition according to the identified setting item.

7. The data processing method according to Item 5, wherein the position information relating to the setting of the printing condition is position information indicating a predetermined specific figure, in the first step, the image forming apparatus creates a table for associating one or more setting items disposed on the hand-writing sheet with position information of the setting items, and in the third step, the electronic pen which has obtained the table from the image forming apparatus or the image forming apparatus picks out position information indicating the specific figure from the plurality of pieces of position information, refers to the table, identifies a setting item associated with the picked-out position information, and sets the printing condition according to the identified setting item.

8. The data processing method according to Item 5, wherein the position information relating to the setting of the printing condition is position information indicating a predetermined specific character string, and in the third step, the electronic pen or the image forming apparatus picks out position information indicating the specific character string from the plurality of pieces of position information, identifies a setting item which corresponds to the specific character string, and sets the printing condition according to the identified setting item.

9. The data processing method according to Item 6, wherein in the third step, when a plurality of setting items are identified, if printing conditions set according to the plurality of setting items are inconsistent, the electronic pen or the image forming apparatus makes only one setting item selected from the plurality of setting items effective, or a user is notified of the inappropriate setting of the printing conditions.

10. The data processing method according to Item 5, wherein in the fourth step, the image forming apparatus moves a position of the image or enlarges or reduces a size of the image so that the image based on the bitmap data can be printed at a center of the printing sheet.

BRIEF DESCRIPTION OF THE DRAWINGS

FIG. 15 shows an example of a job setting table.

FIG. 16 is a drawing showing the coordinates of the function setting input section on the hand-writing sheet according to the third embodiment of the present invention.

FIG. 17 is an example of the table for associating the function setting and the position information.

DETAILED DESCRIPTION OF THE PREFERRED EMBODIMENT

Figure 1:
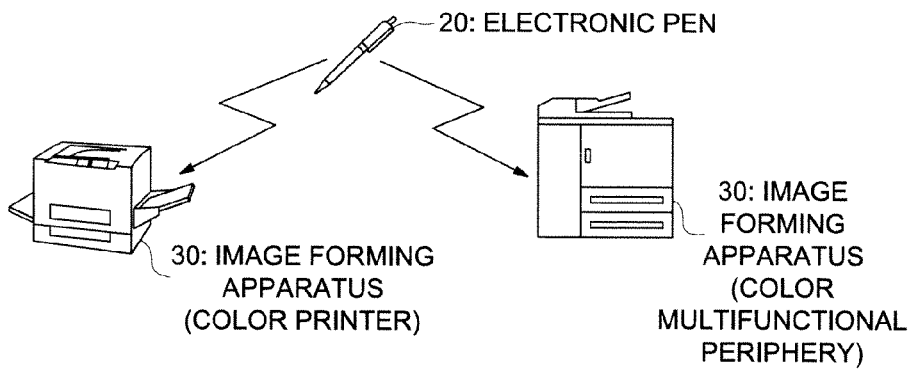
FIG. 1 is a schematic drawing showing the configuration of a printing system according to the first embodiment of the present invention.

As shown in the above paragraphs sub-titled BACKGROUND OF THE INVENTION, when printing a hand-written image drawn by means of an electronic pen, a method is used wherein electronic pen data indicating the movement locus of the electronic pen is analyzed by a computer device to obtain the hand-written image, and then instructions to print based on the hand-written image are sent to an image forming apparatus. However, in this method, a hand-written image cannot be printed without using a computer device, which creates an inconvenient situation. In addition, operation is troublesome because a dedicated application program and a printer driver must be installed beforehand in each computer device.

On the other hand, the image forming apparatus comprises a language analysis section for analyzing printing data written in the page description language (PDL), such as a post script (PS) and a printer control language (PCL), and creating intermediate data, and an image processing section for rasterizing the intermediate data to create bitmap data. Therefore, by providing the language analysis section of the image forming apparatus with a function for analyzing information of the position on a sheet, direct printing is made possible by means of the image forming apparatus without using a computer device.

Accordingly, in an embodiment of the present invention, the above language analysis section is provided with a function for analyzing electronic pen data. When the language analysis section receives electronic pen data that includes multiple pieces of position information obtained by detecting a position detection mark printed on a hand-writing sheet by means of an electronic pen, the language analysis section analyzes the electronic pen data, identifies one or more hand-written images, and creates intermediate data that defines the arrangement of the objects including respective hand-written images; and the image processing section then creates bitmap data from the intermediate data.

By doing so, without needing a computer device, it is possible to print a hand-written image drawn by an electronic pen, and it is not necessary to install in each computer device a dedicated application program to analyze electronic pen data and a printer driver. Consequently, the user's convenience can be improved.

In addition, by expanding a function of the language analysis section, even an existing image forming apparatus can transform electronic pen data into intermediate data, which makes it possible to establish an advanced general-purpose system.

Furthermore, by allocating an area for setting printing conditions to a sheet where images are manually drawn by an electronic pen, there is no need for setting printing conditions on the panel of the image forming apparatus. Consequently, the user's convenience can be further improved.

For the above direct printing, setting of printing conditions must be conducted by the use of a display window on the electronic pen or an operation panel of the image forming apparatus. In the former case, setting is very difficult because the display window on the electronic pen is small; and in the latter case, operation becomes troublesome because operation of the panel of the image forming apparatus is required to conduct printing. Furthermore, there is another method of setting printing conditions wherein a setting sheet on which each setting item of printing conditions has been allocated at a predetermined position of a sheet having a specific printed pattern is printed, and the printing conditions are set by operating an electronic pen on the printed setting sheet. However, in this method, operation becomes troublesome because a dedicated setting sheet must be prepared beforehand, and two sheets, i.e., a hand-writing sheet and a dedicated setting sheet, must be used.

Accordingly, in an embodiment of the present invention, for the purpose of easily setting printing conditions of a hand-written image drawn on a hand-writing sheet, it is made possible for an image forming apparatus or an electronic pen to pick out position information relating to the setting of printing conditions (e.g., position information of a position within a specific area, position information indicating a specific figure, position information indicating a specific character string, etc.) from multiple pieces of information on positions on one hand-writing sheet having a specific printed pattern, set printing conditions according to the position information, and print a hand-written image specified by position information other than the position information relating to the setting of printing conditions according to the set printing conditions.

By doing so, there is no need for using a display window on the electronic pen or an operation panel of the image forming apparatus, and therefore, it is possible to easily conduct the setting of printing conditions. Furthermore, it is not necessary to separately prepare a dedicated sheet for setting the printing conditions, and only one sheet can be used for drawing a hand-writing image and setting printing conditions. Consequently, the user's convenience can be improved.

Embodiment 1

Figure 2:
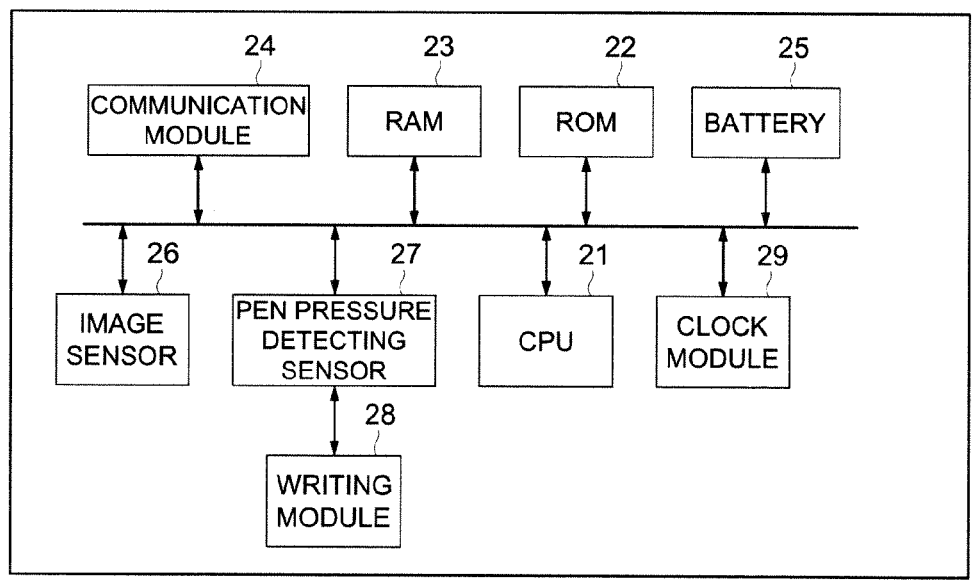
FIG. 2 is a block diagram showing the configuration of an electronic pen according to the first embodiment of the present invention.
Figure 3:
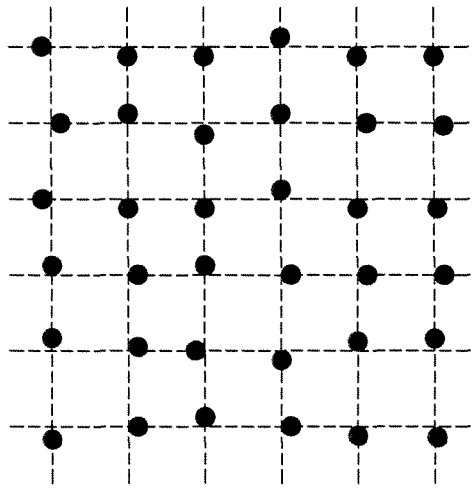
FIG. 3 is a drawing showing an example of the ANOTO (registered mark) pattern.
Figure 4:
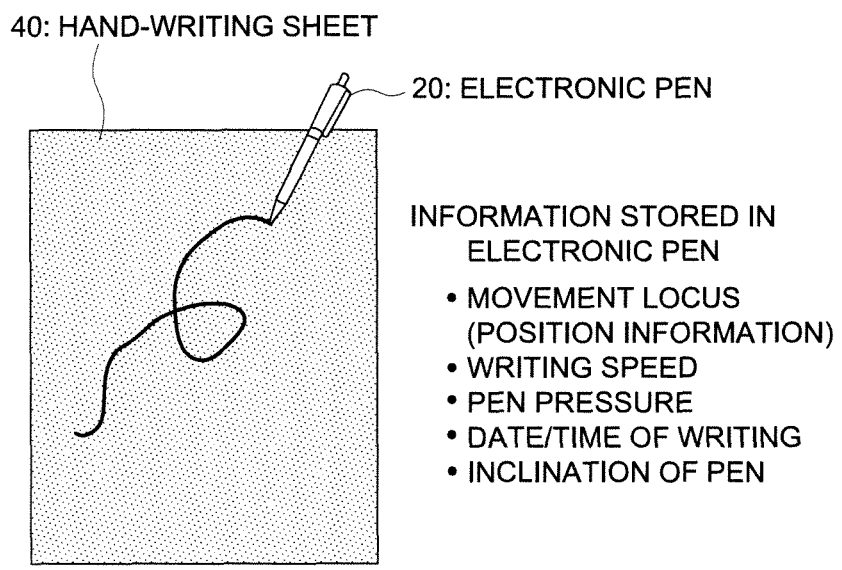
FIG. 4 is a drawing describing a hand-writing operation using an electronic pen.
Figure 5:
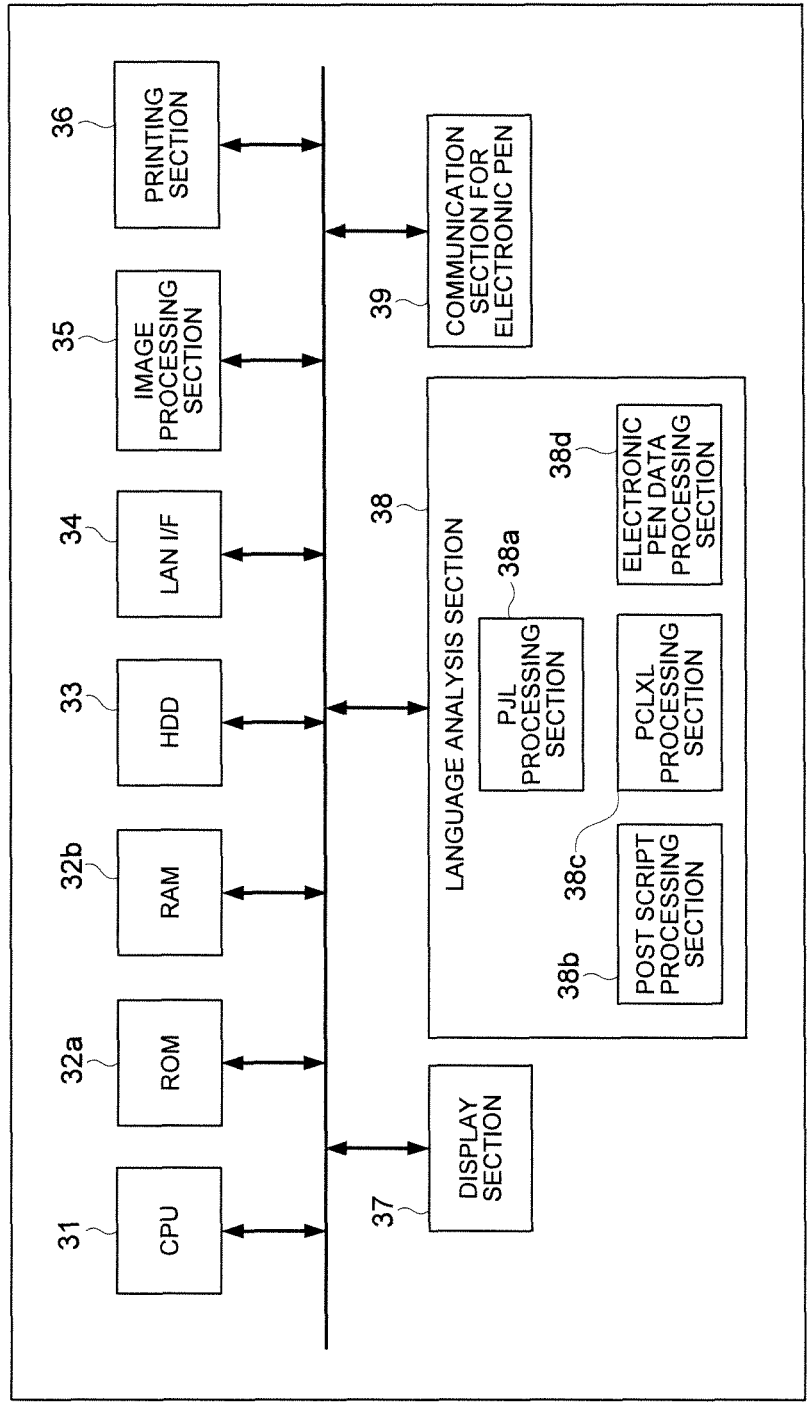
FIG. 5 is a block diagram showing the configuration of an image forming apparatus according to the first embodiment of the present invention.
Figure 6:
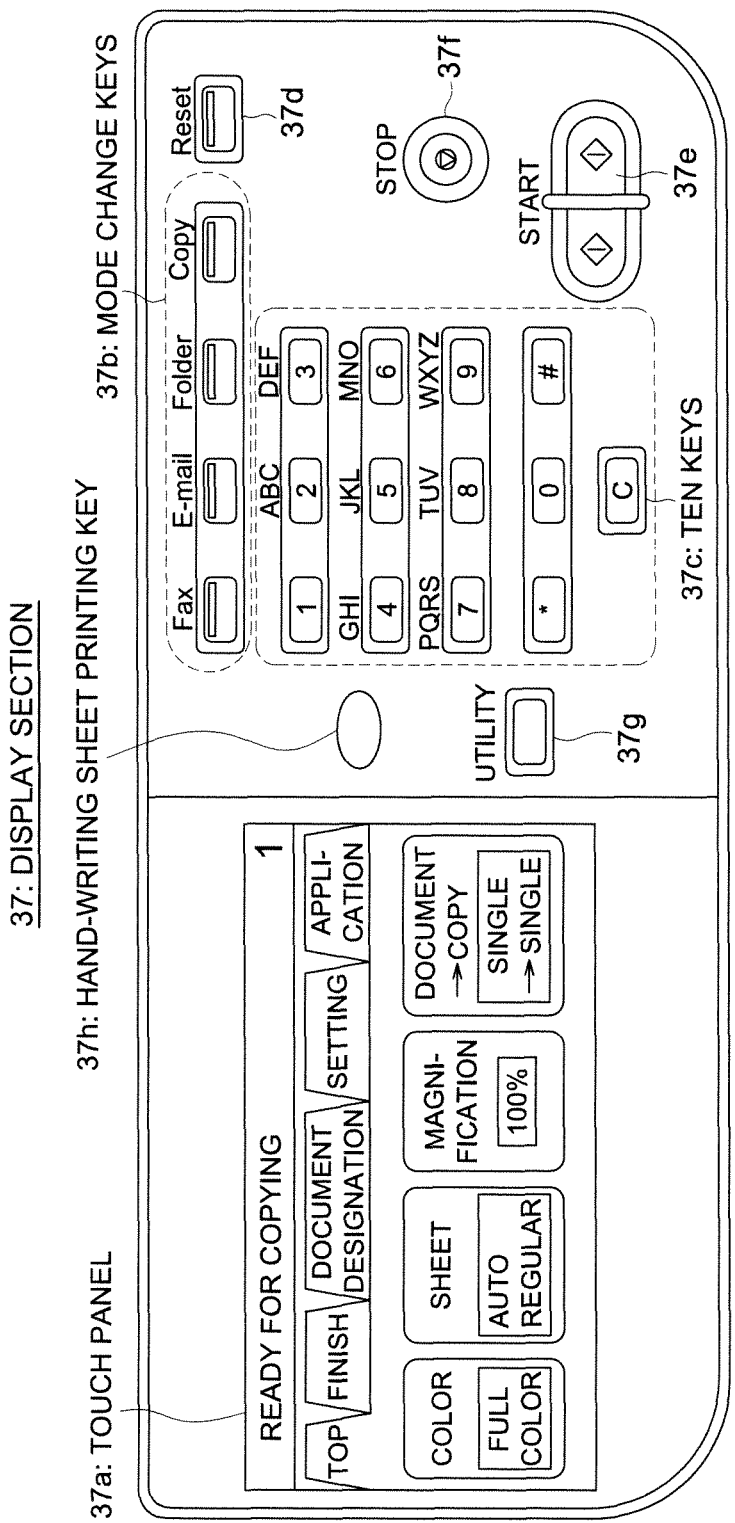
FIG. 6 is a drawing showing an example of the exterior of the display section of the image forming apparatus according to the first embodiment of the present invention.
Figure 7:
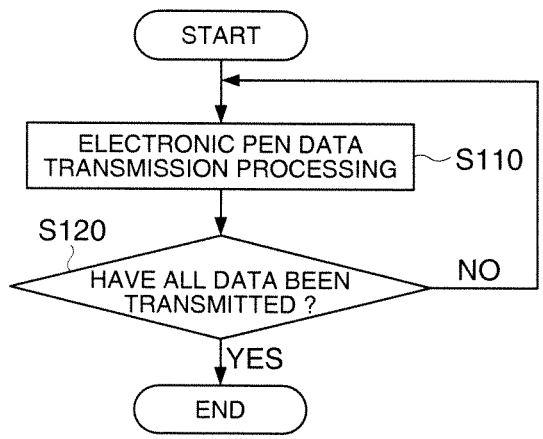
FIG. 7 is a flowchart showing the entire processing of an electronic pen according to the first embodiment of the present invention.
Figure 8:
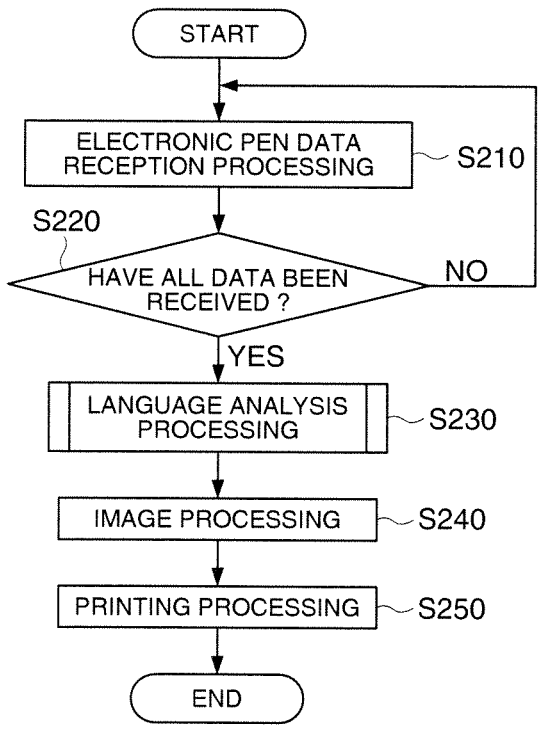
FIG. 8 is a flowchart showing the entire processing of an image forming apparatus according to the first embodiment of the present invention.
Figure 9:
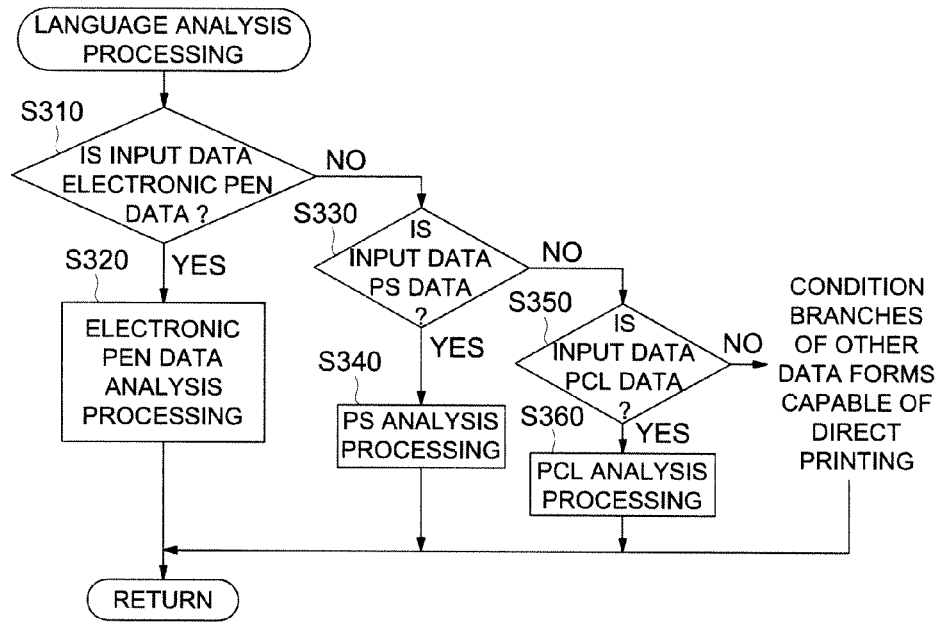
FIG. 9 is a flowchart showing the language analysis processing of an image forming apparatus according to the first embodiment of the present invention.
Figure 10:
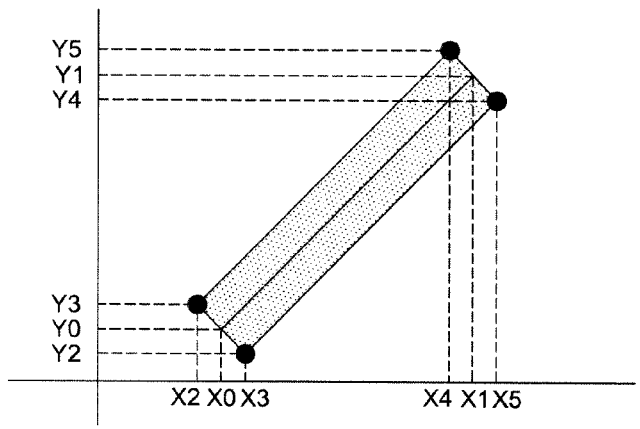
FIG. 10 is a drawing showing the relationship between the electronic pen data and the intermediate data.

To describe the above-mentioned embodiment of the present invention in detail, an image forming apparatus and data processing program according to the first embodiment of the present invention will be described with reference to FIG. 1 through FIG. 10. FIG. 1 is a schematic drawing showing the configuration of a printing system according to this embodiment. FIG. 2 is a block diagram showing the configuration of an electronic pen according to this embodiment, FIG. 3 is a drawing showing an example of the ANOTO (registered mark) pattern, and FIG. 4 is a drawing describing a hand-writing operation using an electronic pen. Furthermore, FIG. 5 is a block diagram showing the configuration of an image forming apparatus according to this embodiment, and FIG. 6 is a drawing showing an example of the exterior of a display section of an image forming apparatus. FIG. 7 is a flowchart showing the processing of an electronic pen according to this embodiment, FIG. 8 and FIG. 9 are flowcharts showing the processing of an electronic pen according to this embodiment, and FIG. 10 is a drawing showing the relationship between the electronic pen data and the intermediate data.

As shown in FIG. 1, a printing system 10 according to this embodiment includes an electronic pen 20 for transmitting data (hereafter, referred to as electronic pen data) including multiple pieces of position information showing the movement locus of the pen tip on the sheet (hereafter, referred to as a hand-writing sheet) on which a position detection mark (hereafter, referred to as a specific pattern), typically the ANOTO (registered mark) pattern, has been printed, and an image forming apparatus 30, such as a color printer or a color multifunctional periphery, for printing a hand-written image drawn by an electronic pen 20 as well as characters and figures of printing target (hereafter, referred to as a hand-written image) based on the electronic pen data transmitted from the electronic pen 20. Hereafter, each apparatus will be described in detail with reference to the drawings.

[Electronic Pen]

FIG. 2 is a block diagram showing the configuration of an electronic pen 20; and the electronic pen 20 includes a CPU (central processing unit) 21, a ROM (read only memory) 22, a RAM (random access memory) 23, a communication module 24, a battery 25, an image sensor 26, a pen pressure detecting sensor 27, a writing module 28, and a clock module 29.

The CPU 21 is a data processing apparatus that computes according to a program. The ROM 22 is an information storage section that stores the program. The RAM 23 is an information storage section that stores a variety of data including specific pattern data. The CPU 21 and memories, such as the ROM 22 and the RAM 23, constitute a control section.

The communication module 24 communicates with a communication section for electronic pen 39 of the image forming apparatus 30 via short-range wireless communication, typically Bluetooth (registered mark), or wire communication. The battery 25 is a primary battery or a secondary battery that is a power source for the electronic pen 20. The image sensor 26 is a small CCD (charge coupled device) for reading a pattern or a CMOS (complementary metal oxide semiconductor) video camera. The pen pressure detecting sensor 27 is a piezoelectric element or the like that detects pen pressure of the electronic pen 20. The writing module 28 identifies the position of the electronic pen 20 on a hand-writing sheet based on the specific pattern read by the image sensor 26, and creates electronic pen data including multiple pieces of position information indicating the movement locus of the pen tip. The clock module 29 is an apparatus for maintaining time information.

Herein, the electronic pen 20 is satisfactory if it is equipped with a function to identify the position on a hand-writing sheet and transmit electronic pen data including position information (coordinates) to the image forming apparatus 30, and its configuration, shape, and communication method are not particularly limited. For example, the electronic pen 20 may be configured such that it distinguishes the configuration of the pattern, degree of density, color density and so on, thereby identifying the position; or, for example, the electronic pen 20 may be provided with operation buttons for making various settings, a display window, a speaker or a lamp to issue a warning. Furthermore, the electronic pen 20 may be configured such that it may identify the position in conjunction with an apparatus disposed near the hand-writing sheet (e.g., according to the angle or distance with respect to the apparatus). This embodiment is to use the ANOTO (registered mark) pattern.

FIG. 3 shows an example of the ANOTO (registered mark) pattern. This ANOTO (registered mark) pattern is a dot pattern where dots are arranged in grid-like fashion, and each dot is slightly deviated in either the upward, downward, right, or left direction from the grids perpendicular to one another at 0.3 mm intervals; and the image sensor 26 reads the pattern in a matrix unit of altogether 36 dots (vertical six dots×horizontal six dots) at a time. Since the ANOTO (registered mark) pattern has a unique value at any point, if the arrangement of the hand-writing sheet and the ANOTO (registered mark) pattern to be combined with the hand-writing sheet is determined (i.e., determination of which portion of ANOTO (registered mark) pattern that is cut from the pattern space is to be combined with the hand-writing sheet), the electronic pen 20 can recognize an arbitrary position on the hand-writing sheet. The ANOTO (registered mark) pattern data is to be stored beforehand in the ROM 22 in the electronic pen 20, or the image forming apparatus 30; however, the data can be stored in the network server and used via the network whenever it is needed.

FIG. 4 shows an example in which an electronic pen 20 configured as described above is used to manually draw an image on a hand-writing sheet 40 with a specific pattern printed on it. The electronic pen 20 stores information, such as the movement locus of the pen tip (position information), writing speed, pen pressure, date/time of writing, and inclination of pen, and transmits electronic pen data including position information indicating the movement locus to the image forming apparatus 30. The image forming apparatus 30 analyzes the electronic pen data to identify printing conditions, creates intermediate data from the movement locus, rasterizes the intermediate data to create bitmap data, and then prints out by the bitmap data according to the specified printing conditions. Conventional methods for printing hand-written images drawn by an electronic pen 20 include a method of copying a hand-writing sheet 40 on which an image has been manually drawn by an electronic pen 20 by the use of an image forming apparatus 30, and a method of processing electronic pen data by a computer device, and giving the image forming apparatus 30 instructions for printing. However, those methods have problems as described below.

In the former case, since the electronic pen 20 can use ink to draw an image in the same way as an ordinary ballpoint pen, by copying a hand-writing sheet 40 on which an image has been drawn in ink, the hand-written image can be printed. However, in this method, a specific pattern on the hand-writing sheet 40 is also copied onto a sheet, which makes undesirable appearance. In addition, copying takes time and is laborious, and also image quality deteriorates due to scanning.

In the latter case, the electronic pen data is transmitted to a computer device that is connected via a communication module. Then, the computer device uses a dedicated application program to analyze the electronic pen data and uses a printer driver to provide printing instructions, thereby the hand-written image can be printed. This method, however, requires a computer device and moreover requires a dedicated application program and a printer driver. Also, this method takes users more time than copying.

Accordingly, in this embodiment, electronic pen data is directly transmitted to the image forming apparatus 30, and the image forming apparatus 30 analyzes the electronic pen data to create intermediate data, rasterizes the intermediate data to create bitmap data, and then prints out by the data. The image forming apparatus 30 equipped with such a function will be described with reference to FIG. 5.

[Image Forming Apparatus]

FIG. 5 is a block diagram showing the configuration of an image forming apparatus 30 according to this embodiment. The image forming apparatus 30 includes a CPU 31, a ROM 32a, a RAM 32b, an HDD 33, a LAN I/F (interface) 34, an image processing section 35, a printing section 36, a display section 37, a language analysis section 38, and a communication section for electronic pen 39; and those devices are connected via a bus.

The CPU 31 is a data processing apparatus that computes according to a program. The ROM 32a is an information storage section that stores the program. The RAM 32b is an information storage section that stores a variety of data including electronic pen data received via the communication section for electronic pen 39, specific pattern data, and a table that will be described later. The CPU 31 and memories, such as the ROM 32a and the RAM 32b, constitute a control section.

The HDD 33 stores printing data received via the LAN OF section 34, electronic pen data received via the communication section for electronic pen 39, intermediate data created from the printing data and the electronic pen data, bitmap data created from the intermediate data, specific pattern data, and a table which will be described later.

The LAN I/F section 34 is an expansion card that connects to a user's computer device or the like via a LAN (local area network). The LAN UF section 34 inputs printing data transmitted from the user's computer device or the like, and transmits image data created according to the signal of scanned image to the user's computer device or the like.

The image processing section 35 rasterizes intermediate data created by the language analysis section 38, transforms the data into bitmap data that can be printed in the printing section 36, and when necessary, the image processing section 35 conducts image processing, such as magnification variation, image rotation, density adjustment, edge reinforcement, smoothing, binarization, and so on.

The printing section 36 is composed of the components necessary for image forming that uses image forming processes including an electrophotographic system, an electrostatic recording method and so on, and forms an image on the specified sheet based on the bitmap data created by the image processing section 35.

The display section 37 is composed of a pressure-sensitive touch panel where transparent electrodes are disposed in grid-like fashion on a LCD (liquid crystal display) or on an organic EL (electroluminescence) display, and hard keys. FIG. 6 shows a specific example of the display section 37. Function settings can be made via the touch panel 37a, mode switching key 37b, and ten keys 37c. The use of the reset key 37d can restore the settings to the initial setting values. Furthermore, pressing the start key 37e will start operations, such as copying, printing, and transmitting, and pressing the stop key 37f will stop those operations. The use of the utility key 37g enables the system setting and the adjustment of the image forming apparatus 30 itself. Moreover, pressing the hand-writing sheet printing key 37h to be described later can print the hand-writing sheet, if it is provided.

The language analysis section 38 includes a PJL processing section 38a, a Post Script processing section 38b, a PCLXL processing section 38c, and an electronic pen data processing section 38d. The PJL processing section 38a, Post Script processing section 38b, and the PCLXL processing section 38c are functions usually included in the language analysis section of the image forming apparatus. Those functions analyze the printing data entered from a computer device or the like via the LAN I/F 34, such as PJL (printer job language) commands, page-description languages including PS, PCLXL an so on, or, PDF (portable document format) data, and create intermediate data. The electronic pen data processing section 38d is an expanded function of the language analysis section, which analyzes electronic pen data entered via the communication section for electronic pen 39 and creates intermediate data. Also, as described later, the electronic pen data processing section 38d picks out position information relating to the setting of printing conditions (e.g., position information of a position within a specific area, position information indicating a specific figure, position information indicating a specific character string, etc.) from multiple pieces of information on positions on one hand-writing sheet 40, sets the printing conditions according to the position information, and creates intermediate data from position information other than the position information relating to the setting of printing conditions (i.e., position information relating to a hand-written image). Furthermore, when necessary, the electronic pen data processing section 38d judges whether the specified printing conditions are inconsistent (i.e., whether different setting items have been selected for the same function). When printing conditions are inconsistent, the electronic pen data processing section 38d makes only one setting item selected from plural setting items effective, or notifies the user that the printing conditions are incorrect.

The communication section for electronic pen 39 communicates with a communication module 24 of the electronic pen 20 via short-range wireless communication, typically Bluetooth (registered mark) communication method, or wire communication, receives electronic pen data from the electronic pen 20, and stores the data in the RAM 32b.

Herein, the above image processing section 35 and the language analysis section 38 of the image forming apparatus 30 may be configured as hardware, or may be configured as a data processing program that enables the image forming apparatus 30 to function as an image processing section 35 or a language analysis section 38 (at least an electronic pen data processing section 38d), and the data processing program may be operated by the control section.

Hereafter, procedures for printing a hand-written image by the use of the electronic pen 20 and the image forming apparatus 30 configured as described above will be described with reference to the flowcharts in FIG. 7 through FIG. 9.

In the electronic pen 20, as shown in FIG. 7, when a user moves the electronic pen 20 on a hand-writing sheet on which a specific pattern has been printed, the writing module 28 of the electronic pen 20 obtains position information (coordinates on the sheet) from the specific pattern read by the image sensor 26 while the pen pressure detecting sensor 27 is detecting pressure (while the user is drawing an image on the hand-writing sheet), and creates electronic pen data including multiple pieces of position information indicating the movement locus of the pen tip. Then, the communication module 24 is used to transmit the electronic pen data to the image forming apparatus 30 (S110), and when all data is transmitted, communication is terminated (S120).

In the image forming apparatus 30, as shown in FIG. 8, the communication section for electronic pen 39 is used to receive electronic pen data from the electronic pen 20 (S210), the data is stored in the RAM 32b or HDD 33, and when all electronic pen data is received, communication is terminated (S220).

After that, the language analysis section 38 conducts language analysis processing of input data (S230). FIG. 9 is a flowchart showing the detail of the language analysis processing. First, it is judged whether the input data is electronic pen data (data listing pieces of position information) (S310). When the input data is electronic pen data (Yes in S310), the electronic pen data processing section 38*d* analyzes the electronic pen data and transforms the data into intermediate data (S320).

To provide specific description of this step, as shown in FIG. 4, information stored in the electronic pen 20 includes the movement locus of the pen tip (position information), writing speed, pen pressure, date/time of writing, inclination of pen and so on. If all of the information is transmitted as electronic pen data, the electronic pen data processing section 38*d* picks out position information from those pieces of information. Then, the movement locus identified according to the position information is classified into one or more hand-written images.

Herein, each hand-written image is usually an image defined by a continuous locus (i.e., a traversable character (e.g., "C") or figure (e.g., "O") with one stroke etc.). Even if plural loci are not continuous, if the drawing time of respective loci is within a predetermined time period, it is preferred that those multiple loci be regarded as one hand-written image. Furthermore, when positions of respective loci are located within the predetermined distance, it is also preferred that those multiple loci be regarded as one hand-written image.

Then, a rectangle that surrounds the hand-written image is identified from a group of position information that corresponds to each hand-written image, and intermediate data that defines the arrangement of respective objects (position information of vertices of each rectangle) is created with the area surrounded by the rectangle being regarded as one object. FIG. 10 shows an example of the electronic pen data and the intermediate data, in which the electronic pen data that describes position information of the start point and the end point corresponds to the intermediate data that describes position information of respective vertices of the rectangle that surrounds the line connecting the start point to the end point. Herein, electronic pen data is considered as vector data; however, even if the electronic pen data lists pieces of position information of a painted-over image, by identifying a rectangle that surrounds the painted-over image in the same manner, it is possible to transform the data into intermediate data.

When the input data is not electronic pen data (No in S310), it is judged whether the input data is PS data (S330); and when the input data is PS data (Yes in S330), the Post Script processing section 38*b* analyzes the PS data and transforms the data into intermediate data (S340). When the input data is not PS data (No in S330), it is judged whether the input data is PCL data (S350); and when the input data is PCL data (Yes in S350), the PCLXL processing section 38*c* analyzes the PCL data and transforms the data into intermediate data (S360). When the input data is not PCL data (No in S350), it is judged whether the input data is another form that supports direct printing, and appropriate analysis processing for each data form is conducted; subsequently, the data is transformed into intermediate data. Herein, procedures after S330 are the same as those of the normal printing procedures.

In FIG. 8, when the language analysis processing in S230 has been completed, the image processing section 35 rasterizes the intermediate data and transforms the data into bitmap data that can be used for painting in the printing section 36, and when necessary, the image processing section 35 conducts image processing, such as magnification variation, image rotation, density adjustment, edge reinforcement, smoothing, binarization, and so on. (S240).

Herein, when creating intermediate data from electronic pen data, depending on which part of the movement locus is to be recognized as one hand-written image, in some cases, plural objects overlap one another. For example, when drawing a figure on another figure, if two figures are recognized as one hand-written image, no problems will arise; however, if each figure is regarded as one hand-written image, objects in respective rectangular areas that include respective hand-written images overlap one another. Then, when objects are sequentially developed as bitmap images and synthesized, in the portion where objects overlap one another, one object is painted over by another object. In that case, by masking the portion where a hand-written image in each object has not been drawn, and picking out only pixels on the hand-written image and synthesizing them, it is possible to prevent either one of the objects from being painted over by another object even when objects overlap one another.

After that, the printing section 36 forms an image on the specified sheet based on the bitmap data created by the image processing section 35 (S250). In that process, printing conditions relating to a sheet, bookbinding (duplex setting, etc.), page layout or others may be set on the screen displayed on the touch panel 37*a* in FIG. 6, or default settings of the image forming apparatus 30 may be used.

When default settings are used, the size of the bitmap data sometimes exceeds the default-set size of the sheet. In that case, the image processing section 35 may be able to reduce the size of the bitmap data according to the size of the sheet or conduct image processing including trimming, or the control section may be able to issue information to give instructions for loading an appropriate size of the sheet for the bitmap data.

As described above, directly transmitting electronic pen data to the image forming apparatus 30 and printing out by the data will not require a computer device, and a dedicated application program or a printer driver does not need to be installed in the computer device. Thus, it is possible to increase the user's convenience as well as establish an advanced general-purpose system.

Embodiment 2

Figure 11:
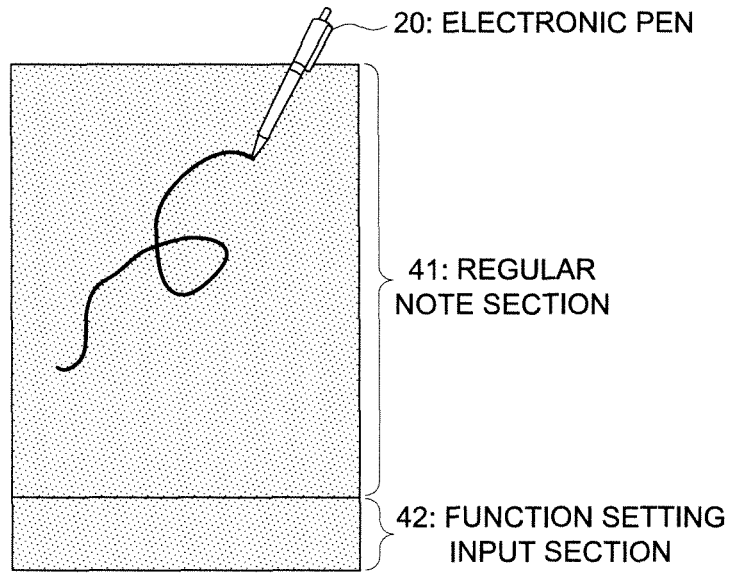
FIG. 11 is a drawing showing the configuration of a hand-writing sheet according to the second embodiment of the present invention.
Figure 12:
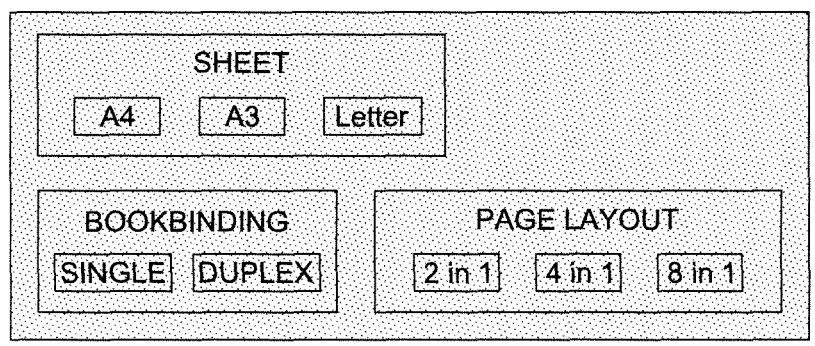
FIG. 12 is a drawing showing the configuration of the function setting input section on the hand-writing sheet according to the second embodiment of the present invention.
Figures 13, 14:
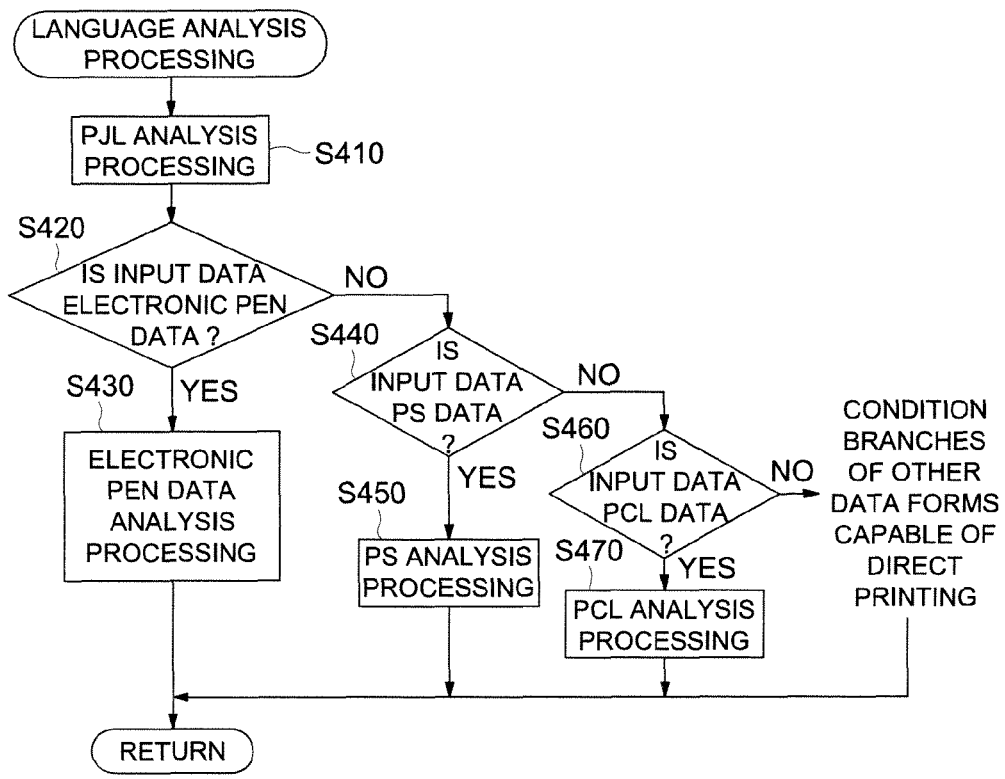
FIG. 13 is a drawing showing an example of instruction using the PJL command.
FIG. 14 is a flowchart showing the language analysis processing of the image forming apparatus according to the second embodiment of the present invention.

Next, an image foaming apparatus and data processing program according to the second embodiment of the present invention will be described with reference to FIG. 11 through FIG. 15. FIG. 11 is a drawing showing the configuration of a hand-writing sheet according to this embodiment, and FIG. 12 is a drawing showing the configuration of the function setting input section on the hand-writing sheet. Furthermore, FIG. 13 is a drawing showing an example of instruction using the PJL command, FIG. 14 is a flowchart showing the language analysis processing of the image forming apparatus, and FIG. 15 shows an example of a job setting table.

In the above first embodiment, printing conditions relating to a sheet, bookbinding (duplex setting, etc.), page layout and others, are set on the screen displayed on the touch panel 37*a*, or default settings of the image forming apparatus 30 are used. However, it is possible to set the printing conditions on the hand-writing sheet by allocating a predetermined area of the hand-writing sheet as the area for setting the printing conditions.

Accordingly, in this embodiment, as shown in FIG. 11, a function setting input section 42 is provided on a hand-writing sheet 40 in addition to the regular note section 41 on which a hand-writing image is to be entered, each setting item of the printing conditions is placed in each predetermined position of the function setting input section 42 as shown in FIG. 12, and the table that associates the type of the setting items with their positions is stored in a memory such as a RAM 23. Then, when tapping a predetermined setting item by the use of an electronic pen 20, the control section of the electronic pen 20 refers to the above table and identifies the setting item allocated in the tapped position, adds the printing condition defined by the specified setting item to the electronic pen data, and then transmits the data to the image forming apparatus 30. Although the method of adding the printing conditions defined by the specified setting items to the electronic pen data is arbitrary, as shown in FIG. 13, for example, instructions can be provided by the use of the PJL command and so on.

Processing (language analysis processing) of the image forming apparatus 30 in this case will be described with reference to the flowchart in FIG. 14.

First, the PJL processing section 38a analyzes the PJL command portion of the input data and stores the values of various parameters in the job setting table as shown in FIG. 15 (S410).

After that, in the same manner as the first embodiment, it is judged whether the input data is electronic pen data (S420); and when the data is electronic pen data, the electronic pen data processing section 38d analyzes the electronic pen data and transforms the data into intermediate data (S430). When the input data is not electronic pen data, it is judged whether the data is PS data (S440), and when the data is PS data, the Post Script processing section 38b analyzes the PS data and transforms the data into intermediate data (S450). When the input data is not PS data, it is judged whether the data is PCL data (S460), and when the data is PCL data, the PCLXL processing section 38c analyzes the PCL data and transforms the data into intermediate data (S470). When the input data is not PCL data, it is judged whether the input data is another form that supports direct printing, and appropriate analysis processing for each data form is conducted; subsequently, the data is transformed into intermediate data.

Thus, by providing a configuration where a hand-writing sheet 40 is provided with a function setting input section 42, printing conditions are set by operating the function setting input section 42 by the use of an electronic pen 20, and the electronic pen 20 recognizes the setting, adds the setting contents to the electronic pen data, and transmits the data to the image forming apparatus 30; users do not have to go to the image forming apparatus 30 in order to operate the touch panel 37a to set printing conditions, which can further improve the user's convenience.

Embodiment 3

Figure 18:
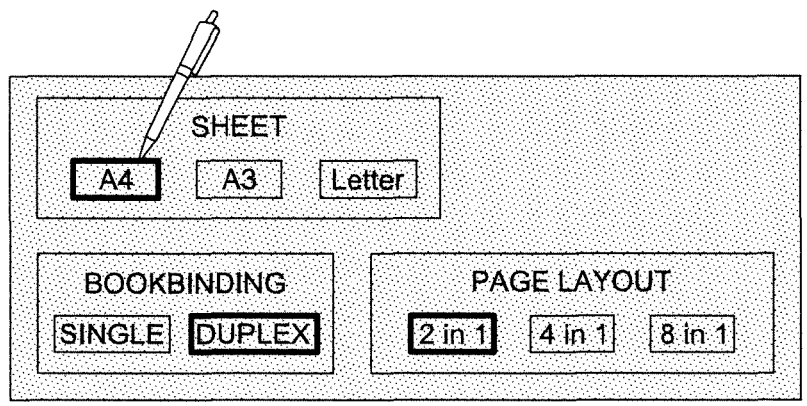
FIG. 18 is a drawing showing the printing condition setting operation using a hand-writing sheet according to the third embodiment of the present invention.

Next, an image forming apparatus and data processing program according to the third embodiment of the present invention will be described with reference to FIG. 16 through FIG. 21. FIG. 16 is a drawing showing the coordinates of each setting item in the function setting input section on a hand-writing sheet according to this embodiment, and FIG. 17 is an example of the table for associating the function setting and the position information. Furthermore, FIG. 18 is a drawing showing the printing condition setting operation by means of the function setting input section, and FIG. 19 through FIG. 21 are flowcharts showing the processing of an image forming apparatus according to this embodiment.

As described above, the second embodiment is configured such that the electronic pen 20 recognizes the setting items selected by the user, adds the data to the electronic pen data, and transmits the data to the image forming apparatus 30. However, the setting items selected by the user can be recognized by the image forming apparatus 30 side. Accordingly, in this embodiment, the electronic pen 20 recognizes position information of the setting items tapped by the user in the function setting input section 42 as electronic pen data and transmits the data to the image forming apparatus 30, and then the image forming apparatus 30 side identifies the setting items according to the position information within the function setting input section 42 and prints out by the data according to the printing conditions specified by the specified setting items.

FIG. 16 is a drawing showing the coordinates of the function setting input section 42 on the hand-writing sheet 40 shown in FIG. 11, where the coordinates of each setting item button are set. In addition, the HDD 33 of the image forming apparatus 30 stores the table for associating respective setting items (function and option) with their position information as shown in FIG. 17. As shown in FIG. 18, when the A4 button in the Sheet area of the function setting input section 42, the Duplex button in the Bookbinding area, and the 2in1 button in the Page Layout area are tapped by an electronic pen 20 or those functions are check-marked, the position information of the buttons is transmitted to the image forming apparatus 30 in the same manner as ordinary electronic pen data.

Figure 19:
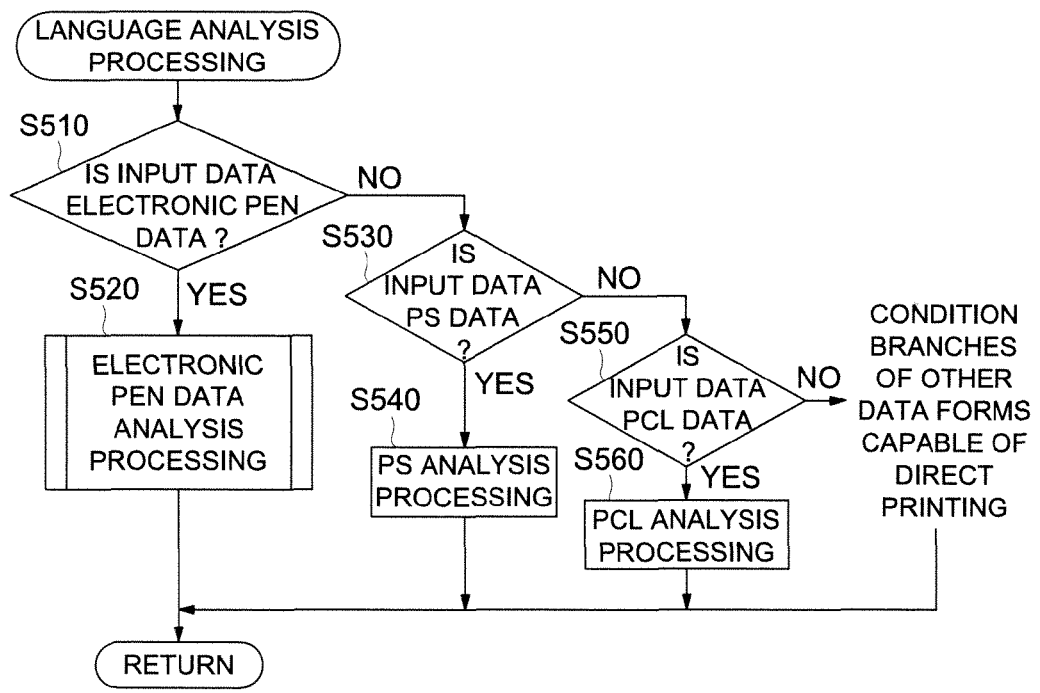
FIG. 19 is a flowchart showing the operation (language analysis processing) of an image forming apparatus according to the third embodiment of the present invention.
Figure 20:
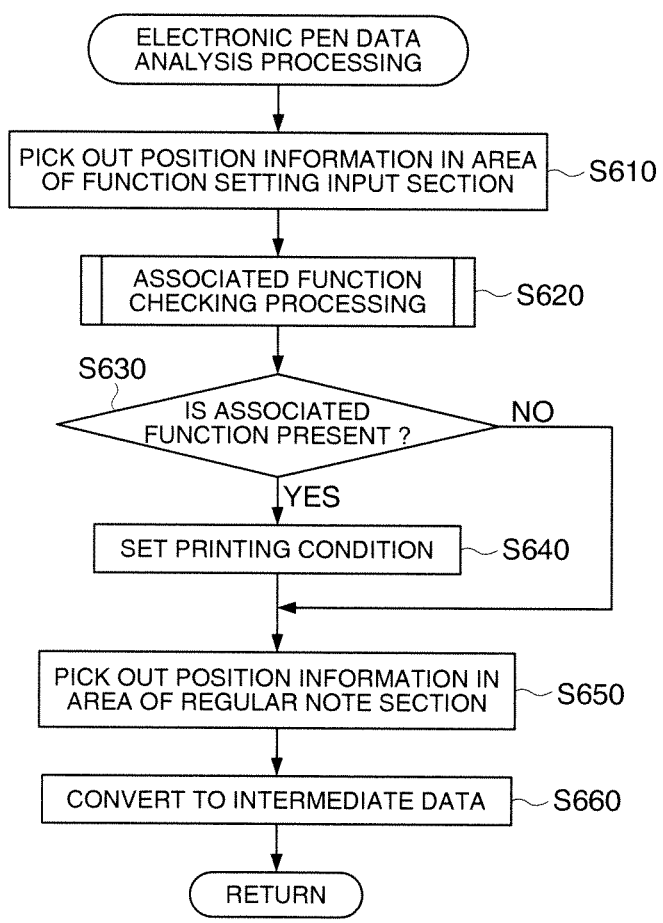
FIG. 20 is a flowchart showing the operation (electronic pen data analysis processing) of an image forming apparatus according to the third embodiment of the present invention.
Figure 21:
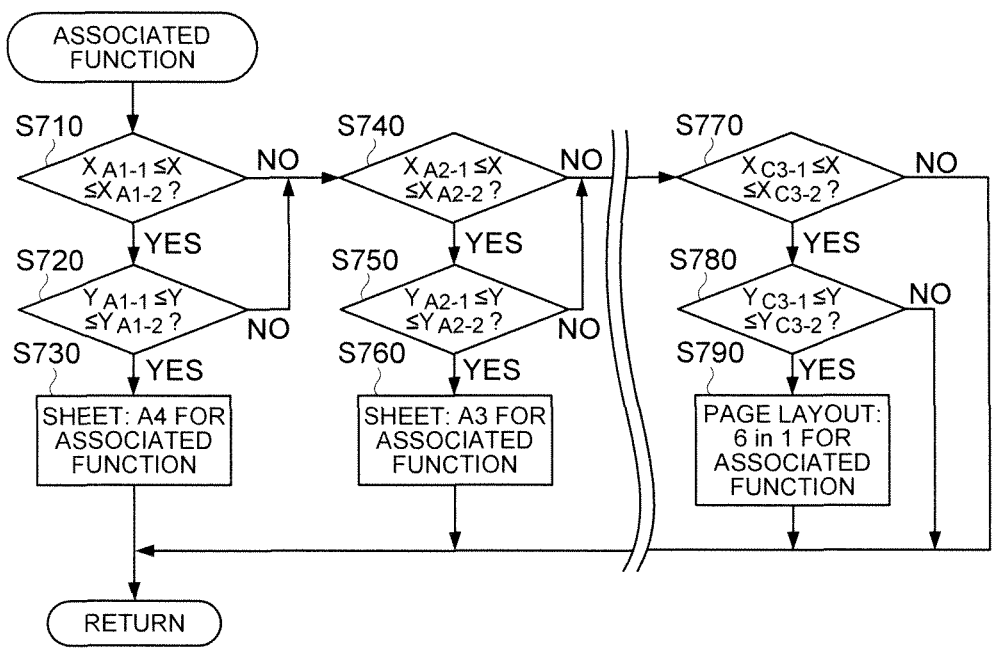
FIG. 21 is a flowchart showing the operation (association function checking processing) of an image forming apparatus according to the third embodiment of the present invention.

On the other hand, the image forming apparatus 30 conducts the language analysis processing according to the flowcharts in FIG. 19 through FIG. 21.

First, in the same manner as the first embodiment, it is judged whether the input data is electronic pen data (S510); and when the input data is electronic pen data (Yes in S510), the electronic pen data processing section 38d analyzes the electronic pen data and transforms the data into intermediate data (S520).

FIG. 20 is a flowchart showing the details of this step. First, position information in the area of the function setting input section 42 is picked out from the electronic pen data (S610), and the association function checking processing is executed (S620).

Specifically, as shown in FIG. 21, it is judged whether the X-coordinate of the picked-out position information is within the range between $X_{A1-1}$ and $X_{A1-2}$ (S710); and when the X-coordinate is within the range, it is judged whether the Y-coordinate of the picked-out position information is within the range between $Y_{A1-1}$ and $Y_{A1-2}$ (S720). When Yes is answered in both S710 and S720, the table in FIG. 17 is referred to, and it is determined that the function associated with the position information is the "Sheet" and the option is "A4" (S730).

When No is answered in S710 or S720, it is judged whether the X-coordinate of the picked-out position information is within the range between $X_{A2-1}$ and $X_{A2-2}$ (S740); and when the X-coordinate is within the range, it is judged whether the Y-coordinate of the picked-out position information is within the range between $Y_{A2-1}$ and $Y_{A2-2}$ (S750). When Yes is answered in both S740 and S750, the table in FIG. 17 is referred to, and it is determined that the function associated with the position information is the "Sheet" and the option is "A3" (S760).

The same procedures are conducted repeatedly. It is judged whether the X-coordinate of the picked-out position information is within the range between $X_{C3-1}$ and $X_{C3-2}$ (S770); and when the X-coordinate is within the range, it is judged whether the Y-coordinate of the picked-out position information is within the range between $Y_{C3-1}$ and $Y_{C3-2}$ (S780). When Yes is answered in both S770 and S780, the table in FIG. 17 is referred to, and it is determined that the function associated with the position information is the "Page Layout" and the option is "6in1" (S790).

In FIG. 20, the electronic pen data processing section 38d judges whether there is a function associated in the association function checking procedure (S630); and if there is a function, printing conditions are set according to the function and the option (S640).

Next, position information in the area of the regular note section 41 is picked out from the electronic pen data (S650). Then, a hand-written image is identified from the picked-out position information, and the data is transformed into intermediate data to print the hand-written image according to the specified printing conditions (S660).

In FIG. 19, when the input data is not electronic pen data, in the same manner as the first and second embodiments, it is judged whether the data is PS data (S530); and when the data is PS data, the Post Script processing section 38b analyzes the PS data and transforms the data into intermediate data (S540). When the input data is not PS data, it is judged whether the data is PCL data (S550); and when the data is PCL data, the PCLXL processing section 38c analyzes the PCL data and transforms the data into intermediate data (S560). When the input data is not PCL data, it is judged whether the input data is another form that supports direct printing; and appropriate analysis processing for each data form is conducted; subsequently, the data is transformed into intermediate data.

Thus, by storing the table for associating each setting item in the function setting input section 42 on the hand-writing sheet 40 with its position information in the image forming apparatus 30, and since the image forming apparatus 30 side confirms which setting item has been selected; it is not necessary to provide an electronic pen 20 with a new function to recognize the setting item, and therefore, an existing electronic pen 20 can be used. Consequently, it is possible to establish an advanced general-purpose system.

Embodiment 4

Figure 22:
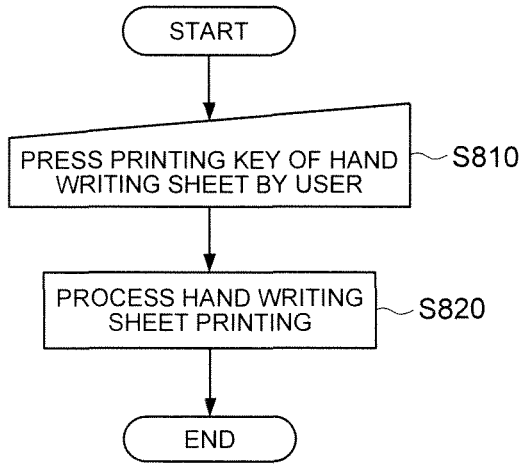
FIG. 22 is a flowchart showing the processing (hand-writing sheet printing processing) of an image forming apparatus according to the fourth embodiment of the present invention.
Figure 23A:
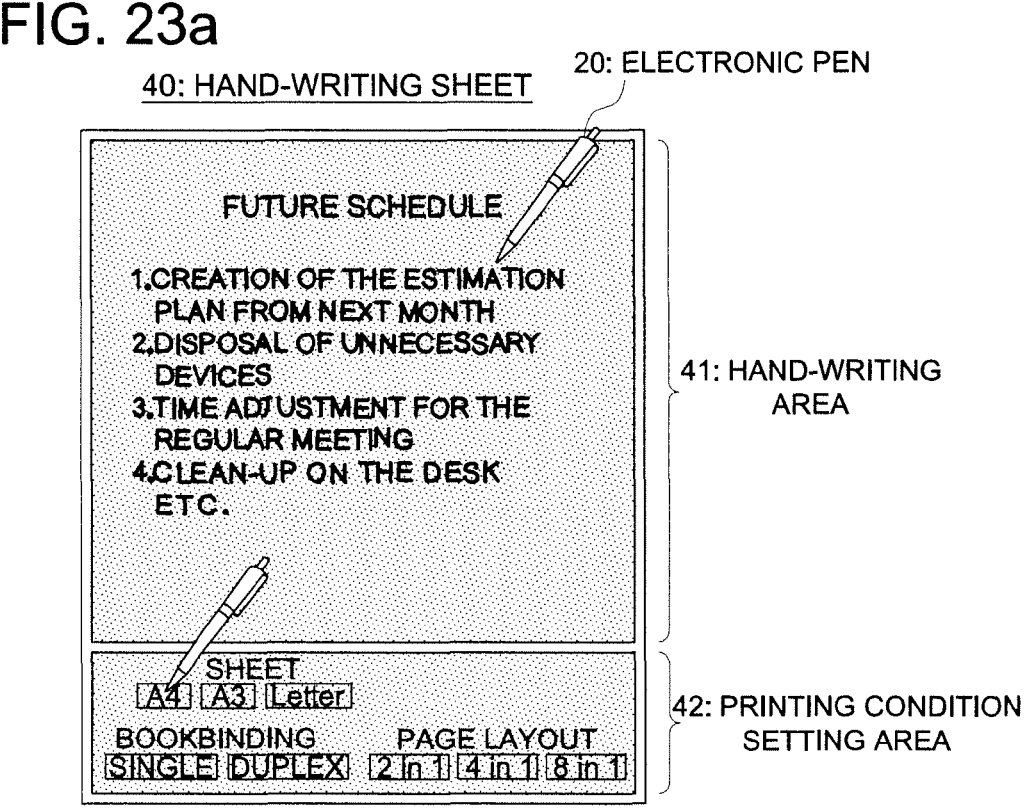
FIG. 23a is a drawing showing an example of a hand-writing sheet according to the fourth embodiment of the present invention.
Figure 23B:
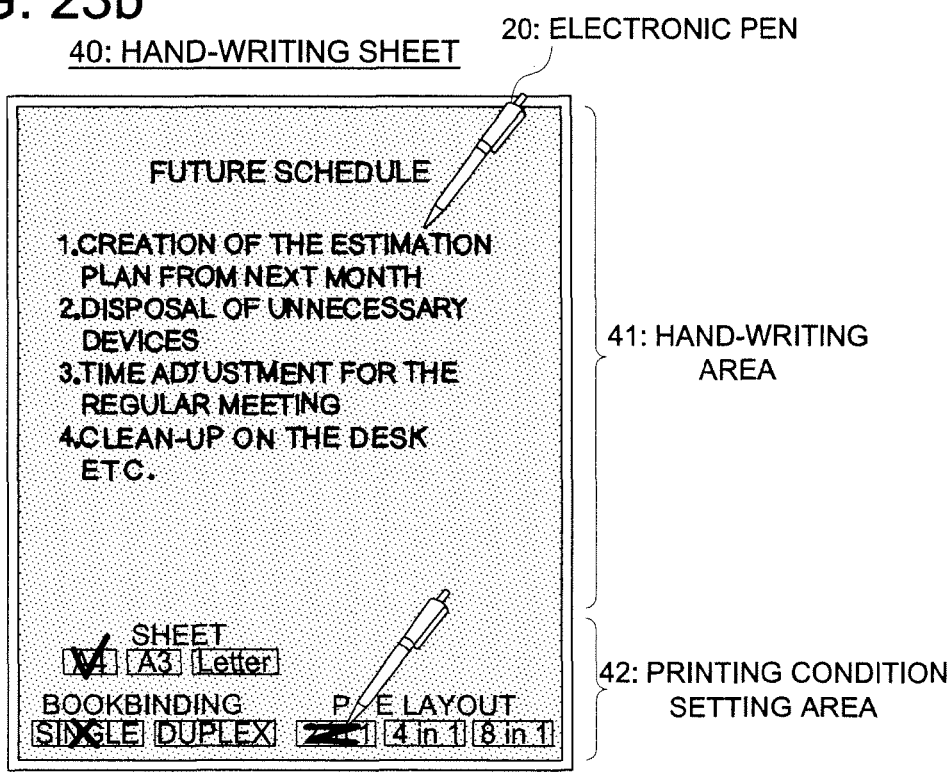
FIG. 23b is a drawing showing another example of a hand-writing sheet according to the fourth embodiment of the present invention.
Figure 23C:
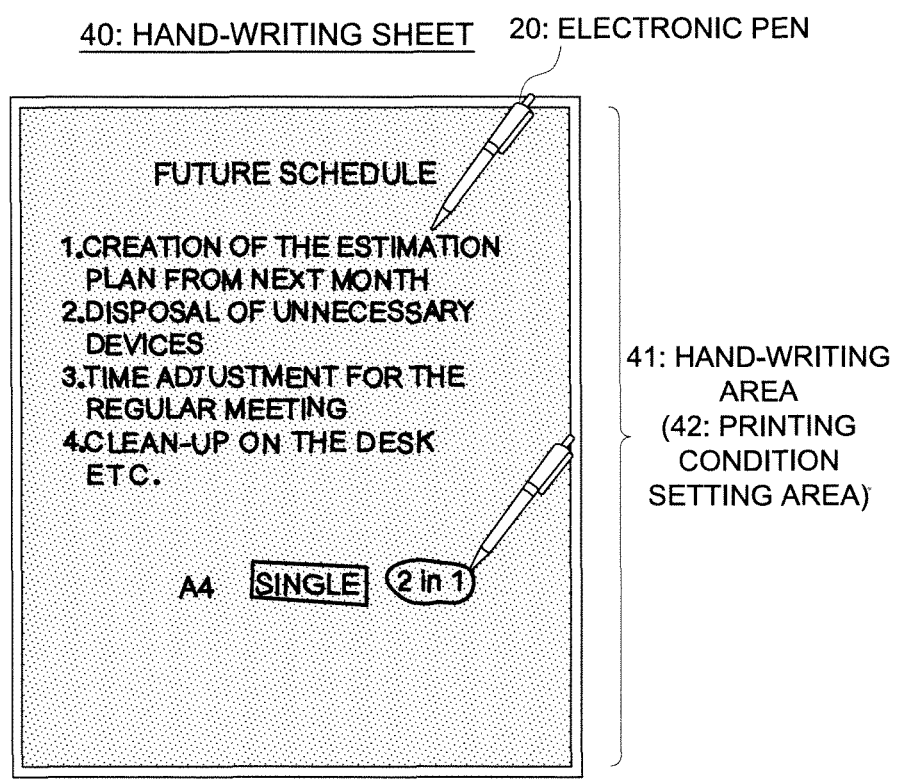
FIG. 23c is a drawing showing another example of a hand-writing sheet according to the fourth embodiment of the present invention.
Figure 24:
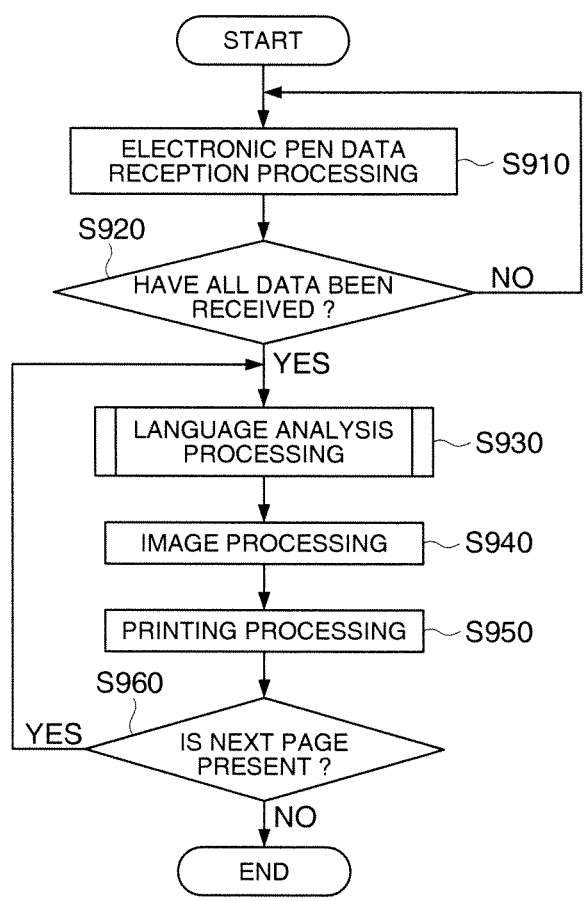
FIG. 24 is a flowchart showing the entire processing of an image forming apparatus according to the fourth embodiment of the present invention.
Figure 25:
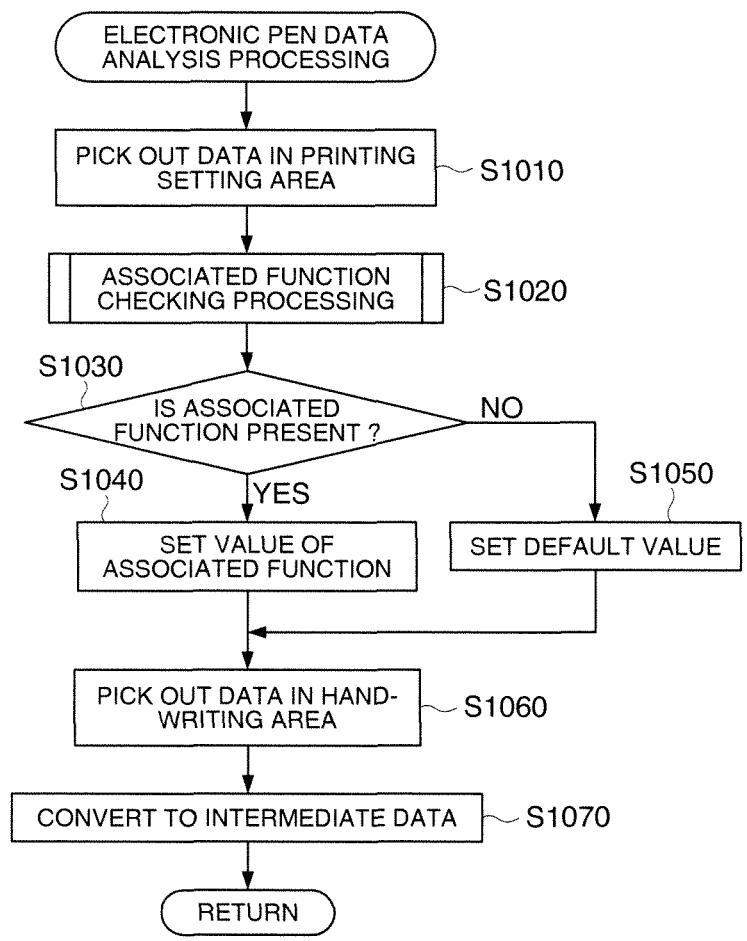
FIG. 25 is a flowchart showing the processing (electronic pen data analysis processing) of an image forming apparatus according to the fourth embodiment of the present invention.
Figure 26:
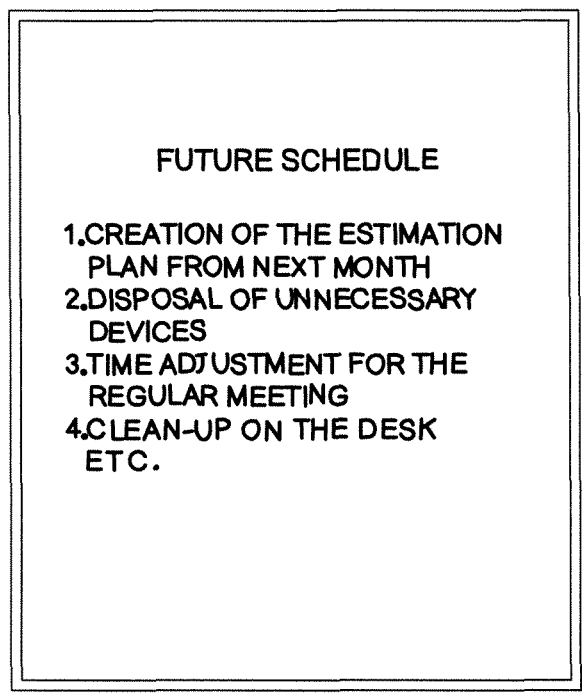
FIG. 26 is a drawing showing an example of a printed matter according to the fourth embodiment of the present invention.

To describe the above-mentioned embodiment of the present invention in further detail, a data processing method, image forming apparatus and electronic pen and data processing program according to the fourth embodiment of the present invention will be further described with reference to FIG. 22 through FIG. 26. FIG. 22 is a flowchart showing the procedures for printing a hand-writing sheet, and each of FIGS. 23a-23c shows an example of the configuration of the hand-writing sheet. FIG. 24 through FIG. 25 are flowcharts showing processing of an image forming apparatus according to this embodiment. FIG. 26 shows an example of a printed matter on which a hand-written image has been printed.

Hereafter, operation of the printing system 10 according to this embodiment will be described. First, procedures for creating a hand-writing sheet 40 by the use of an image forming apparatus 30 will be described with reference to the flowchart in FIG. 22.

When a user presses the hand-writing sheet printing key 37h in the display section 37 to give instructions for printing the hand-writing sheet 40 (S810), the image processing section 35 of the image forming apparatus 30 creates a specific pattern image from the specific pattern data that has been stored beforehand in the RAM 32b or the HDD 33; and the printing section 36 prints the image on a sheet thereby creating a hand-writing sheet 40.

As shown in FIG. 23a, the hand-writing sheet 40 is composed of a hand-writing area 41a in which hand-written images, such as characters, figures of printing-target, and so on, are drawn, and a printing condition setting area 42 in which printing conditions of the hand-written image are set. When a user manually writes contents to be printed in the hand-writing area 41 and taps (lightly touches) the area within the frame of the desired setting items disposed in the printing condition setting area 42 by the use of an electronic pen 20, the tapped setting item is set as a printing condition used when the hand-written image drawn in the hand-writing area 41a is printed. If the same function (e.g., sheet) was tapped two or more times (e.g., A4 is tapped and then A3 is tapped), the setting item that was tapped later may be effective (position information is overwritten), or the setting item that was tapped later may be ignored (the setting item tapped first remains effective). Furthermore, if inappropriate setting items were selected (e.g., when 2in1 for page layout and A4 for sheet were selected on the first hand-writing sheet 40, and then A3 for sheet was selected on the second hand-writing sheet 40), the user may be notified of the inappropriate setting by means of an alarm emitted from the speaker of the electronic pen 20, the flashing lamp of the electronic pen 20, or by error information displayed in the display section 37 of the image fowling apparatus 30 at the time the hand-written image is printed.

FIG. 23a shows the basic configuration of the hand-writing sheet 40 according to this embodiment. In this configuration, since the tapped position does not remain on the hand-writing sheet 40, the settings of printing conditions cannot be confirmed; and in addition, when there are many setting items of printing conditions, the hand-writing area 41 becomes small. In that case, as shown in FIG. 23b, for example, the entire sheet is used as a hand-writing area 41a, and setting items of the printing conditions can be printed in the predetermined area within the hand-writing area 41a (the lower area in this drawing). In this case, it is necessary to distinguish the operation of manually writing the contents to be printed from the operation of setting printing conditions. Therefore, when setting the printing conditions, for example, a specific figure that has been predetermined (e.g., check-mark, X mark, Z mark) is written in the area within the frame of each setting item. Then, the image forming apparatus 30 picks out the specific figure from the movement locus of the electronic pen 20 and identifies the setting item that corresponds to the position at which the specific figure was written. In this manner, the locus of the specific figure remains, enabling the printing condition setting to be confirmed, and since the movement loci of figures other than the specific figure are recognized as handwritten images, it is possible to write the content to be printed on the setting items, which will expand the hand-writing area 41. In this manner as well, when a specific figure was drawn on the plurality of setting items for the same function, the setting item for which the figure was drawn later may be effective or ignored. Furthermore, when the setting is inappropriate, the user may be notified of the inappropriate setting by means of an alarm emitted from the speaker of the electronic pen 20, the flashing lamp of the electronic pen 20, or by error information displayed in the display section 37 of the image forming apparatus 30 at the time the hand-written image is printed.

In FIG. 23b, it is made possible to write a content to be printed even on the setting items of printing conditions. However, when setting items and a hand-written image overlap one another, the hand-written image is sometimes difficult to see. In such a case, as shown in FIG. 23c, for example, it is possible to use the entire sheet as a hand-writing area 41a and manually write setting items of printing conditions on arbitrary positions in the hand-writing area 41a. In this case, it is necessary to distinguish the operation of manually writing the contents to be printed from the operation of manually writing setting items of printing conditions. Therefore, when manually writing a setting item, for example, a specific character string (or a specific character string and a frame that surrounds the character string) that corresponds to the setting item is written. Then, the image forming apparatus 30 picks out the specific character string (or the specific character string and the frame that surrounds the character string) from the movement locus of the electronic pen 20, and identifies the setting item that corresponds to the specific character string. In this manner, because setting items can be written in a blank area where no hand-written image has been drawn, the hand-written image is easy to see, which enables the effective use of the hand-writing area 41. Herein, it is preferable that the above specific character string match the setting item of printing conditions; however, for example, a table may be provided so that character strings which abbreviate setting items, character strings in which upper-case and lower-case characters have been converted, and character strings in which vertical and horizontal writing has been changed can be associated. Also in this manner, if specific character strings that correspond to plural setting items set for the same function were drawn, the setting item that corresponds to the specific character string drawn later may be effective or ignored. Furthermore, when the setting is inappropriate, the user may be notified of the inappropriate setting by means of an alarm emitted from the speaker of the electronic pen 20, the flashing lamp of the electronic pen 20, or by error information displayed in the display section 37 of the image forming apparatus 30 at the time the hand-written image is printed.

In the case of the above manners in FIGS. 23*a* and 23*b*, since the image forming apparatus 30 recognizes the position of the setting items on the sheet, the image forming apparatus 30 can associate each setting item with its position on the sheet (coordinates defined by a specific pattern). FIG. 16 shows the coordinates of the locations in the printing condition setting area 42 of hand-writing sheet 40 shown in FIGS. 23*a* and 23*b*, wherein the coordinates of the position of each setting item has been determined. Accordingly, the image forming apparatus 30 creates a table, as shown in FIG. 17, for associating the setting items of printing conditions (function and its option) with their position information (coordinates), and stores the data in the RAM 32*b* or the HDD 33. Due to this, the image forming apparatus 30 can identify a setting item that corresponds to the tapped position or the position at which a specific figure was drawn according to the position information transmitted from the electronic pen 20.

Hereafter, procedures for printing a hand-written image drawn on the above hand-writing sheet 40 will be described with reference to the flowcharts in FIGS. 7, 19, 21, 24, and 25. In the description below, the hand-writing sheet 40 of the type shown in FIG. 23*a* is to be used, and the above table is to be stored beforehand in the RAM 32*b* or the HDD 33 of the image forming apparatus 30.

[Operation of the Electronic Pen 20]

As shown in FIG. 7, when a user moves the electronic pen 20 on a hand-writing sheet 40 on which a specific pattern has been printed, the writing module 28 of the electronic pen 20 obtains position information (coordinates on the sheet) from the specific pattern read by the image sensor 26 while the pen pressure detecting sensor 27 is detecting pressure (while the user is drawing an image on the hand-writing sheet 40), and creates electronic pen data including multiple pieces of position information indicating the movement locus of the pen tip. Then, the communication module 24 is used to transmit the electronic pen data to the image foaming apparatus 30 (S110), and when all data is transmitted, communication has been terminated (S120).

[Operation of the Image Forming Apparatus 30]

As shown in FIG. 24, the control section of the image forming apparatus 30 uses the communication section for electronic pen 39 to receive electronic pen data from an electronic pen 20 (S910), stores the data in a RAM 32*b* or an HDD 33, and terminates communication when all electronic pen data has been received (S920).

After that, the language analysis section 38 conducts language analysis processing of input data (S930). FIG. 19 is a flowchart showing the details of the language analysis processing. First, it is judged whether the input data is electronic pen data (data listing pieces of position information) (S510). When the input data is electronic pen data (Yes in S510), the electronic pen data processing section 38*d* analyzes the electronic pen data and transforms the data into intermediate data (S520).

This step will be described in detail. As shown in FIG. 25, first, position information in the printing condition setting area 42 is picked out from multiple pieces of position information included in the electronic pen data (S1010), and then the association function checking processing is executed (S1020).

Specifically, as shown in FIG. 21, it is judged whether the X-coordinate of the picked-out position information is within the range between $X_{A1\text{-}1}$ and $X_{A1\text{-}2}$ (S710); and when the X-coordinate is within the range, it is judged whether the Y-coordinate of the picked-out position information is within the range between $Y_{A1\text{-}1}$ and $Y_{A1\text{-}2}$ (S720). When Yes is answered in both S710 and S720, the table in FIG. 17 is referred to, and it is determined that the function associated with the position information is the "Sheet" and the option is "A4" (S730).

When No is answered in S710 or S720, it is judged whether the X-coordinate of the picked-out position information is within the range between $X_{A2\text{-}1}$ and $X_{A2\text{-}2}$ (S740); and when the X-coordinate is within the range, it is judged whether the Y-coordinate of the picked-out position information is within the range between $Y_{A2\text{-}1}$ and $Y_{A2\text{-}2}$ (S750). When Yes is answered in both S740 and S750, the table in FIG. 17 is referred to, and it is determined that the function associated with the position information is the "Sheet" and the option is "A3" (S760).

The same procedures are conducted repeatedly. It is judged whether the X-coordinate of the picked-out position information is within the range between $X_{C3\text{-}1}$ and $X_{C3\text{-}2}$ (S770); and when the X-coordinate is within the range, it is judged whether the Y-coordinate of the picked-out position information is within the range between $Y_{C3\text{-}1}$ and $Y_{C3\text{-}2}$ (S780). When Yes is answered in both S770 and S780, the table in FIG. 17 is referred to, and it is determined that the function associated with the position information is the "Page Layout" and the option is "6in 1" (S790).

When an inappropriate setting is selected (e.g., when a plurality of options have been selected for the same function), one of those options may be effective, or error information may be sent to the display section 37. Furthermore, when a hand-writing sheet 40 of the type shown in FIG. 23*b* is to be used, the printing condition may be identified according to the coordinates of the specific figure picked out from the electronic pen data; and when a hand-writing sheet 40 of the type shown in FIG. 23*c* is to be used, the printing condition may be identified by recognizing the specific character string picked out from the electronic pen data.

In FIG. 25, the electronic pen data processing section 38*d* judges whether there is a printing function associated by the association function checking processing (S1030); and when there is such a printing function, the electronic pen data processing section 38*d* sets printing conditions according to the functions and options (S1040). When there is no such a printing function, the electronic pen data processing section 38*d* uses the default printing conditions for the image forming apparatus 30 (S1050).

Next, position information in the hand-writing area 41 is picked out from the electronic pen data (S1060). Then, the hand-written image is identified from the picked-out position information, and the data is transformed into intermediate data to print the hand-written image according to the specified printing conditions (S1070). FIG. 10 shows the example of electronic pen data and intermediate data, in which the electronic pen data that describes position information of the start point and the end point corresponds to the intermediate data that describes position information of respective vertices of the rectangle that surrounds the line connecting the start point to the end point. Herein, electronic pen data is considered as vector data; however, even if the electronic pen data lists pieces of position information of a pained-over image, by identifying a rectangle that surrounds the pained-over image in the same manner, it is possible to transform the data into intermediate data.

In FIG. 19, when the input data is not electronic pen data (No in S510), it is judged whether the input data is PS data (S530); and when the input data is PS data (Yes in S530), the Post Script processing section 38*b* analyzes the PS data and transforms the data into intermediate data (S540). When the input data is not PS data (No in S530), it is judged whether the input data is PCL data (S550); and when the input data is PCL data (Yes in S550), the PCLXL processing section 38*c* analyzes the PCL data and transforms the data into intermediate data (S560). When the input data is not PCL data (No in S550), it is judged whether the input data is another form that supports direct printing, and appropriate analysis processing for each data form is conducted; subsequently, the data is transformed into intermediate data. Herein, procedures after S530 are the same as those of the normal printing procedures.

In FIG. 24, after the language analysis processing in S930 has been completed, the image processing section 35 rasterizes intermediate data and transforms the data into bitmap data that can be used for printing in the printing section 36, and when necessary, the image processing section 35 conducts image processing, such as magnification variation, image rotation, density adjustment, edge reinforcement, smoothing, binarization, and so on (S940). After that, the printing section 36 prints the hand-written image according to the printing conditions specified in the language analysis processing in S930 and the bitmap data created in S940 (S950). Then, the image processing section 35 judges whether there is a next page (S960), and when there is a next page, the procedure returns to S930, and the same procedures is repeated.

FIG. 26 shows an example of a printed matter 50 printed according to the above procedures, in which the hand-written image drawn in the hand-writing area 41 of the hand-writing sheet 40 has been printed. When the hand-writing sheet 40 in FIG. 23*a* is used, since the lower part of the sheet is a printing condition setting area 42, the hand-written image drawn in the hand-writing area 41 is printed in a deviated location. In that case, the image processing section 35 may conduct a centering operation so that the hand-written image can be printed at the center of the printed matter 50, or it may be possible to specify the printing position in the image forming apparatus 30. Furthermore, when the default settings are used, the size of bitmap data sometimes does not match the size of the sheet specified by default. In that case, the image processing section 35 may be able to reduce or enlarge the size of the bitmap data according to the size of the sheet or conduct image processing including trimming, or the control section may be able to issue information to give instructions for loading an appropriate size of the sheet for the bitmap data.

As described above, when receiving electronic pen data from an electronic pen 20, an image forming apparatus 30 according to this embodiment picks out position information relating to the setting of printing conditions (position information in the printing condition setting area 42, position information indicating a specific figure, or position information indicating a specific character string) from multiple pieces of information of positions on one hand-writing sheet 40, which is included in the electronic pen data, sets the printing conditions according to the position information, and then prints the hand-written image according to the set printing conditions. Therefore, it is not necessary to operate the image forming apparatus 30 or the electronic pen 20 to set printing conditions, and there is no need for preparing dedicated sheets to set the printing conditions. Consequently, it is possible to improve the user's convenience.

Embodiment 5

Figure 27:
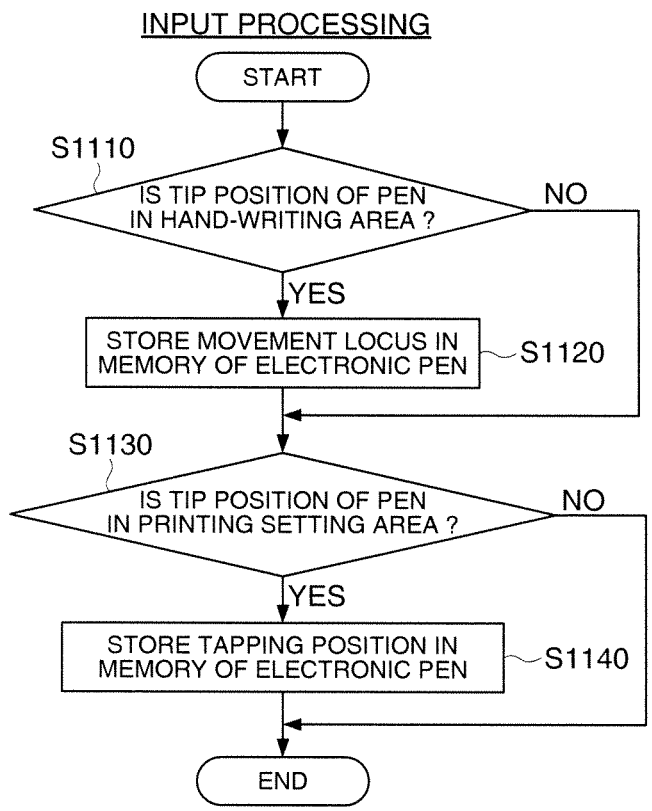
FIG. 27 is a flowchart showing the processing (input processing) of an electronic pen according to the fifth embodiment of the present invention.
Figure 28:
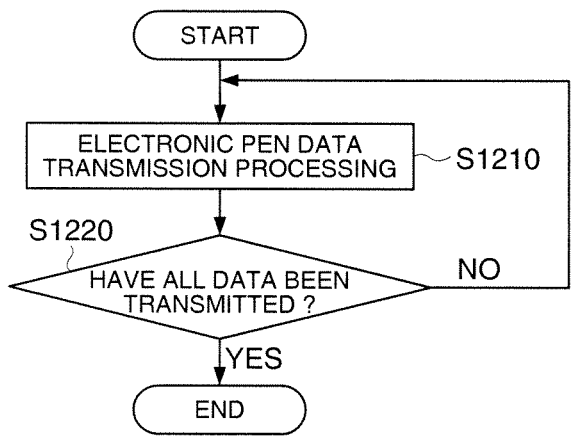
FIG. 28 is a flowchart showing the processing (data transmission processing) of an electronic pen according to the fifth embodiment of the present invention.
Figure 29:
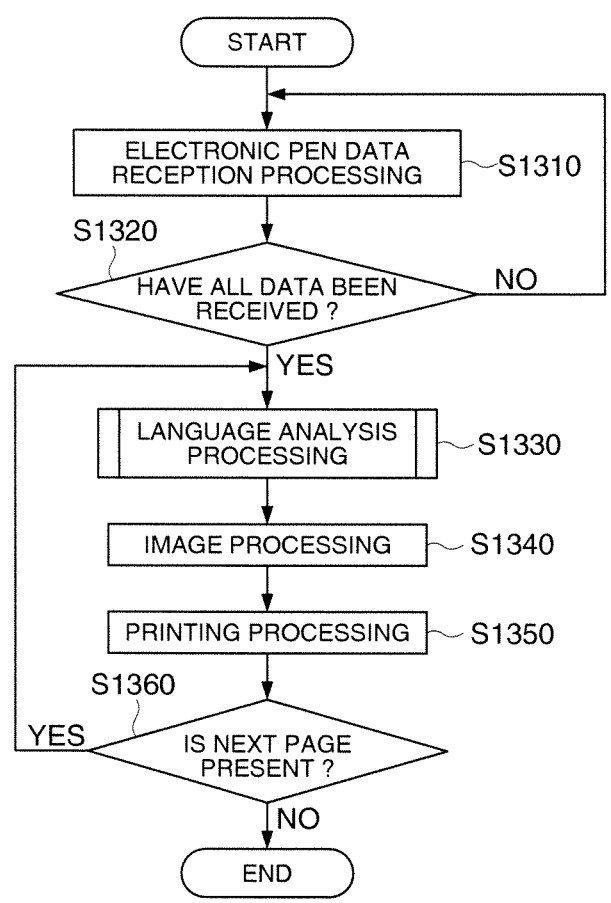
FIG. 29 is a flowchart showing the entire processing of an image forming apparatus according to the fifth embodiment of the present invention.
Figure 30:
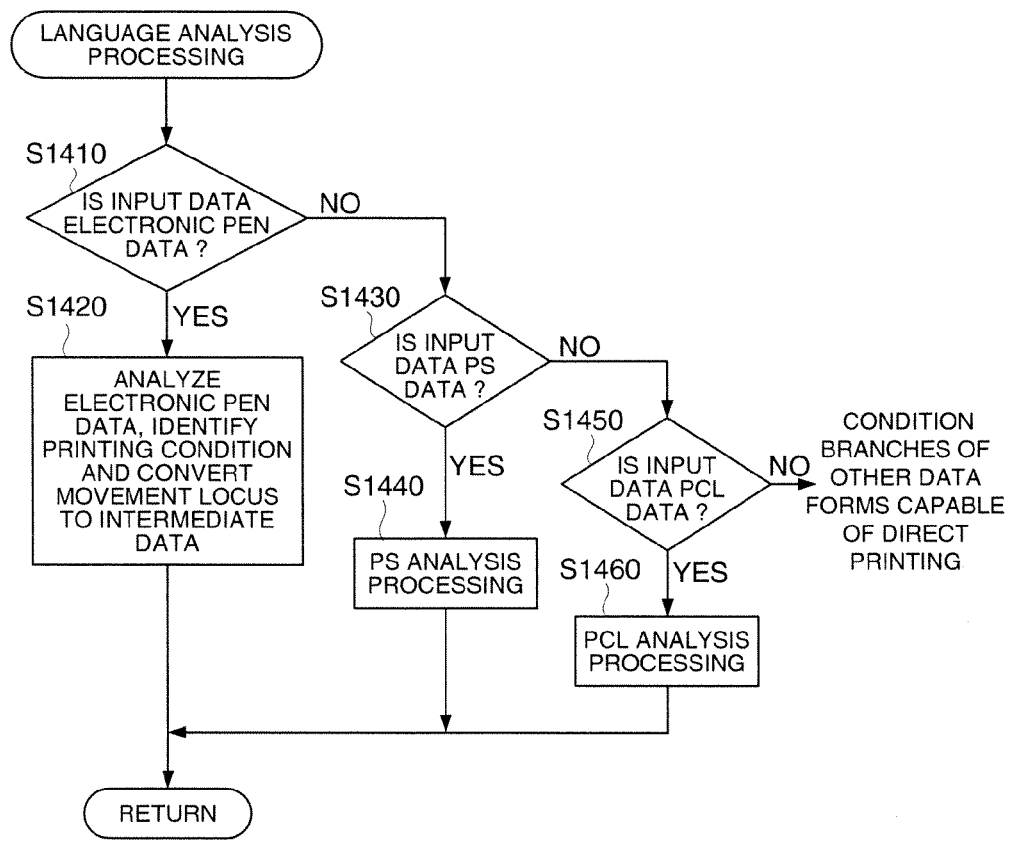
FIG. 30 is a flowchart showing the processing (language analysis processing) of an image fowling apparatus according to the fifth embodiment of the present invention.

Next, a data processing method, image forming apparatus and electronic pen and data processing program according to a fifth embodiment of the present invention will be described with reference to FIG. 27 through FIG. 30. FIG. 27 and FIG. 28 are flowcharts showing the processing of an electronic pen according to this embodiment, and FIG. 29 and FIG. 30 are flowcharts showing the processing of an image forming apparatus according to this embodiment.

In the above fourth embodiment, the electronic pen data processing section 38*d* of the image forming apparatus 30 picks out position information relating to the setting of printing conditions from multiple pieces of position information included in the electronic pen data, and specifies the printing conditions according to the position information. However, a configuration is also possible where the electronic pen 20 itself picks out position information relating to the setting of printing conditions from the position information on the hand-writing sheet 40, identifies printing conditions according to the position information, and adds instruction information designating the specified printing conditions to the electronic pen data and transmits the data to the image forming apparatus 30.

In that case, although configuration of the printing system 10 is the same as that of the fourth embodiment, the storage section of the electronic pen 20, such as a RAM 23, stores the table (table in FIG. 17) for associating the setting items of printing conditions with their position information (coordinates), which is obtained from the image forming apparatus 30. Furthermore, the control section of the electronic pen 20 functions as a data processing section which picks out position information relating to the setting of printing conditions (e.g., position information of a position in the specific area, position information indicating a specific figure, position information indicating a specific character string, etc.) from multiple pieces of position information read from one hand-writing sheet 40 and sets printing conditions according to the position information, and a printing instruction section which adds instruction information designating the set printing conditions to the electronic pen data including position information other than the position information relating to the setting of printing conditions (i.e., position information relating to the hand-written image) and transmits the data to the image forming apparatus 30. When necessary, the control section of the electronic pen 20 also functions as an error detection section which judges whether the set printing conditions are inconsistent (whether different setting items have been selected for the same function), and makes only one setting item selected from plural setting items effective or notifies the user of the inappropriate printing conditions when the printing conditions are inconsistent. The data processing section, printing instruction section, and the error detection section may be configured as hardware; or as a data processing program which enables the control section of the electronic pen 20 to function as the data processing section, printing instruction section, and the error detection section; and the data processing program may be executed by the control section.

Hereafter, operation of the printing system 10 configured as described above will be described with reference to the flowcharts in FIG. 27 through FIG. 30. This embodiment also uses a hand-writing sheet 40 of the type shown in FIG. 23*a*, and the above-mentioned table is transmitted from the image forming apparatus 30 to the electronic pen 20 and stored beforehand in a RAM 23 or the like of the electronic pen 20.

[Operation of the Electronic Pen 20]

When a user moves the electronic pen 20 on a hand-writing sheet 40 on which a specific pattern has been printed, the writing module 28 of the electronic pen 20 obtains position information (coordinates on the sheet) from the specific pattern read by the image sensor 26 while the pen pressure detecting sensor 27 is detecting pressure (while the user is drawing an image on the hand-writing sheet 40). Then, as shown in FIG. 27, the control section of the electronic pen 20 judges whether the position of the pen tip is located within the hand-writing area 41 (S1110); and when the tip position is within the hand-writing area 41, the control section stores the movement locus of the pen tip in a RAM 23 or the like (S1120). Subsequently, the control section judges whether the position of the pen tip is located within the printing condition setting area 42 (S1130), and when the tip position is within the printing condition setting area 42, the control section makes the tapping position to be stored in the RAM 23 or the like (S1140).

After input has been completed, the control section of the electronic pen 20 picks out information of the positions tapped in the printing condition setting area 42 from position information stored in the RAM 23 or the like, refers to the table stored beforehand, identifies the printing conditions that correspond to the position information, and creates printing instruction information designating the specified printing conditions. Then, the control section creates electronic pen data from the movement locus in the hand-writing area 41, and adds the printing instruction information designating the specified printing conditions to the electronic pen data (e.g., instructions by the PJL command, etc.).

In the above operation flow, the printing conditions that correspond to the information of the positions tapped in the printing condition setting area 42 are identified after the input by the electronic pen 20 has been completed. However, the printing condition that corresponds to the position information may be identified in S1140 every time a position is tapped in the printing condition setting area 42. Furthermore, if the identified printing conditions are inappropriate (e.g., when a plurality of setting items have been selected for the same function), one of those setting items may be effective, or a user may be notified of the inappropriate setting by means of an alarm emitted from the speaker of the electronic pen 20, or the flashing lamp of the electronic pen 20.

When a hand-writing sheet 40 of the type shown in FIG. 23*b* is used, it is judged whether the movement locus of the pen tip indicates a specific figure; and when the movement locus of the pen tip indicates a specific figure, printing conditions may be identified according to the coordinates of the specific. When a hand-writing sheet 40 of the type shown in FIG. 23*c* is used, it is judged whether the movement locus of the pen tip indicates a specific character string (or a specific character string and a frame that surrounds the character string); and when the movement locus of the pen tip indicates the specific character string, printing conditions may be identified by recognizing the specific character string.

After that, as shown in FIG. 28, the control section of the electronic pen 20 uses the communication module 24 to transmit electronic pen data which includes printing instruction information designating the specified printing conditions to the image forming apparatus 30 (S1210), and then terminates communication when all of the data has been transmitted (S1220).

[Operation of the Image Forming Apparatus 30]

As shown in FIG. 29, the control section of the image forming apparatus 30 uses the communication section for electronic pen 39 to receive electronic pen data from the electronic pen 20 (S1310), stores the data in a RAM 32*b* or an HDD 33, and then terminates communication when all of the electronic pen data has been received (S1320).

After that, the language analysis section 38 conducts the language analysis processing of the input data (S1330). FIG. 30 is a flowchart showing the language analysis processing in detail. First, it is judged whether the input data is electronic pen data (data listing pieces of position information) (S1410); and when the input data is electronic pen data (Yes in S1410), the electronic pen data processing section 38*d* analyzes the electronic pen data, picks out printing instruction information configured by the PJL command or the like, identifies the printing conditions, and transforms the data of the movement locus in the hand-writing area 41 into intermediate data (S1420). In that process, if the identified printing conditions are inappropriate (e.g., when plural setting items have been selected for the same function), one of those setting items may be effective, or error information may be displayed in the display section 37.

When the input data is not electronic pen data (No in S1410), it is judged whether the input data is PS data (S1430); and when the input data is PS data (Yes in S1430), the Post Script processing section 38*b* analyzes the PS data and transforms the data into intermediate data (S1440). When the input data is not PS data (No in S1430), it is judged whether the input data is PCL data (S1450); and when the input data is PCL data (Yes in S1450), the PCLXL processing section 38*c* analyzes the PCL data and transforms the data into intermediate data (S1460). When the input data is not PCL data (No in S1450), it is judged whether the input data is another form that supports direct printing, and appropriate analysis processing for each data form is conducted; subsequently, the data is transformed into intermediate data. Herein, procedures after S1430 are the same as those of the normal printing procedures.

In FIG. 29, after the language analysis processing in S1330 has been completed, the image processing section 35 rasterizes the intermediate data and transforms the data into bitmap data that can be used for printing in the printing section 36, and, when necessary, the image processing section 35 conducts image processing, such as magnification variation, image rotation, density adjustment, edge reinforcement, smoothing, binarization, and so on (S1340). After that, the printing section 36 prints the hand-written image according to the printing conditions identified by the language analysis processing in S1330 and based on the bitmap data created in S1340, and outputs a printed matter 50 (S1350). Then, it is judged whether there is a next page (S1360), and when there is a next page, the procedure returns to S1330, and similar procedures will be repeated.

When a hand-written image is printed in S1350, in the same manner as the fourth embodiment, the image processing section 35 may conduct a centering operation so that the hand-written image can be printed at the center of the printed matter 50, or the image forming apparatus 30 may specify the printing position. Furthermore, when the default settings are used and if the size of bitmap data does not match the size of the sheet specified by the default setting, the image processing section 35 may be able to reduce or enlarge the size of the bitmap data according to the size of the sheet or conduct image processing including trimming, or the control section may be able to issue information to give instructions for loading an appropriate size of the sheet for the bitmap data.

As described above, an electronic pen 20 according to this embodiment picks out position information relating to the setting of printing conditions (position information in the printing condition setting area 42, position information indicating a specific figure, or position information indicating a specific character string) from multiple pieces of position information detected from one hand-writing sheet 40, sets the printing conditions according to the position information, adds printing instruction information designating the specified printing conditions to the electronic pen data indicating the movement locus in the hand-writing area 41, and transmits the data to the image forming apparatus 30. The image forming apparatus 30 picks out printing instruction information from the electronic pen data and identifies the printing conditions. Thus, it is not necessary to operate the image forming apparatus 30 and the electronic pen 20 to set printing conditions, and there is no need for preparing dedicated sheets to set the printing conditions. Consequently, the user's convenience can be improved.

The present invention is not limited to the above-mentioned embodiments, and various changes may be made to the configuration and control of each device without departing from the spirit of the present invention.

For example, in the above embodiment, only a specific pattern is printed in the regular note section 41 of the hand-writing sheet 40; however, a specific pattern may be combined with a manuscript image and printed, and an image composed of the hand-written image and the manuscript image may be printed.

Furthermore, in the above embodiment, description was made about the methods of setting printing conditions used when printing a hand-written image drawn on a hand-writing sheet 40. Those methods can also be applied to the cases when setting arbitrary functions that can be executed by the image forming apparatus 30, specifically in such cases as the setting of the storage location and the storage format when storing hand-written images drawn on the hand-writing sheet 40 in the storage section including an HDD 33, or as the setting of the destination when sending hand-written images drawn on the hand-writing sheet 40 by e-mail.

The embodiments of the present invention can be used for a data processing program that transforms electronic pen data transmitted from a printer such as an image forming apparatus or an electronic pen into data that can be used by the printer.

Furthermore, the embodiments of the present invention can be used for an electronic pen that reads a specific pattern and transmits position information, an image forming apparatus that prints a hand-written image according to the position information obtained from the electronic pen, a data processing method that uses the electronic pen and the image forming apparatus, and a data processing program that operates in the electronic pen and the image forming apparatus.

According to the image forming apparatus and data processing program in accordance with the embodiments of the present invention, it is possible to print a hand-written image drawn by an electronic pen without using a computer device.

The reason is because when the image forming apparatus receives electronic pen data including multiple pieces of position information obtained by detecting the position detection mark printed on the hand-writing sheet by the use of an electronic pen, the image forming apparatus analyzes the received electronic pen data, identifies one or more hand-written images, creates intermediate data that defines the arrangement of objects including respective hand-written images, rasterizes the intermediate data to create bitmap data, and prints an image according to the bitmap data on a sheet.

Thus, by directly processing electronic pen data by an image forming apparatus, a computer device is not necessary, and a dedicated application program and a printer driver do not have to be installed in any such computer device. Consequently, it is possible to improve the user's convenience and provide an advanced general-purpose system.

According to the data processing method, image forming apparatus and electronic pen and data processing program in accordance with the embodiments of the present invention, it is possible to easily set printing conditions when printing a hand-written image.

The reason is because the electronic pen or the image forming apparatus that receives data from the electronic pen can pick out position information relating to the setting of printing conditions (e.g., position information of a position in the specific area, position information indicating a specific figure, position information indicating a specific character string) from multiple pieces of information of the positions of the electronic pen on one hand-writing sheet on which a specific pattern has been printed, set printing conditions according to the position information, and can print the hand-written image defined by position information other than the position information relating to the setting of printing conditions according to the set printing conditions.

As stated above, since printing conditions for printing a hand-written image can be set on the sheet on which a hand-writing image of a printing-target is to be drawn, it is not necessary to set printing conditions on the panel of an electronic pen or an image forming apparatus; furthermore, it is not necessary to prepare dedicated sheets to set the printing conditions. Consequently, the user's convenience can be significantly improved.

What is claimed is:

1. An image forming apparatus capable of communicating with an electronic pen, the image forming apparatus comprising:
   a communication section for acquiring, from the electronic pen, electronic pen data including a plurality of pieces of position information obtained by detecting a position detection mark printed on a hand-writing sheet by using the electronic pen;
   a language analysis section configured to create intermediate data based on a data type received by the language analysis section, wherein when the data type is electronic pen data, the language analysis section analyzes the electronic pen data, identifies one or more hand-written images specified by the plurality of pieces of position information, and creates intermediate data for each of the one or more hand-written images, the intermediate data specifies an arrangement of an object that surrounds the respective hand-written image;
   an image processing section for rasterizing the intermediate data to create bitmap data; and a printing section for conducting printing based on the bitmap data.

2. The image forming apparatus of claim 1,
wherein an area for setting a printing condition is allocated beforehand on the hand-writing sheet, the image forming apparatus further comprising:
a storage section for storing a table for associating one or more setting items disposed in the area with position information of the setting items, and
wherein when the electronic pen data includes position information of a position in the area, the language analysis section refers to the table, identifies a setting item associated with the position information, and sets the printing condition according to the identified setting item and
the printing section conducts printing according to the set printing condition.

3. The image forming apparatus of claim 1,
wherein an area for setting printing condition is allocated beforehand on the hand-writing sheet, and one or more setting items are disposed in the area,
the electronic pen includes a function for recognizing a setting item based on the position information of a position in the area, obtained by detecting the position detection mark and adding a printing condition based on the recognized setting item to the electronic pen data and transmitting the electronic pen data,
the language analysis section analyzes the electronic pen data, and identifies the printing condition added to the electronic pen data, and
the printing section conducts printing according to the identified printing condition.

4. The image forming apparatus of claim 3,
wherein the printing condition is added to the electronic pen data as a PJL command.

5. A non-transitory computer-readable recording medium storing a data processing program to be executed in an image forming apparatus capable of communicating with an electronic pen,
wherein the data processing program makes the image forming apparatus function as:
a language analysis section that creates intermediate data based on a data type received by the language analysis section, wherein when the data type is electronic pen data, the language analysis section analyzes the electronic pen data including a plurality of pieces of position information obtained by detecting a position detection mark printed on a hand-writing sheet by using the electronic pen, after acquiring the electronic pen data from the electronic pen, identifies one or more hand-written images specified by the plurality of pieces of position information, and creates intermediate data for each of the one or more hand-written images, the intermediate data specifies an arrangement of a rectangular area that surrounds the respective hand-written image; and
an image processing section for rasterizing the intermediate data to create bitmap data usable for printing.

6. The non-transitory computer-readable recording medium of claim 5,
wherein an area for setting printing condition is allocated beforehand on the hand-writing sheet, and
wherein when the electronic pen data includes position information of a position in the area, the language analysis section refers to a table for associating one or more setting items disposed in the area with position information of the setting items, identifies a setting item associated with the position information, and sets the printing condition according to the identified setting item.

7. The non-transitory computer-readable recording medium of claim 5,
wherein an area for setting printing condition is allocated beforehand on the hand-writing sheet, and one or more setting items are disposed in the area,
the electronic pen includes a function for recognizing a setting item based on the position information of a position in the area, obtained by detecting a position detection mark and adding a printing condition based on the recognized setting item to the electronic pen data and transmitting the electronic pen data, and
the language analysis section analyzes the electronic pen data, and identifies the printing condition added to the electronic pen data.

8. The non-transitory computer-readable recording medium of claim 7,
wherein the printing condition is added to the electronic pen data as a PJL command.

9. A data processing method in a system in which an electronic pen capable of detecting a position detection mark is communicably connected to an image forming apparatus for printing an image drawn by the electronic pen, the data processing method comprising:
a first step of the image forming apparatus printing one hand-writing sheet combined with the position detection mark;
a second step of the electronic pen obtaining a plurality of pieces of position information by detecting the position detection mark on the one hand-writing sheet;
a third step of the electronic pen or the image forming apparatus which has obtained the plurality of pieces of position information from the electronic pen, picking out position information relating to setting of a printing condition from the plurality of pieces of position information and setting the printing condition based on the picked-out position information; and
a fourth step of the image forming apparatus transforming, into intermediate data, information of a movement locus of the electronic pen specified by position information other than the position information relating to the setting of the printing condition, rasterizing the intermediate data to create bitmap data, and printing an image based on the bitmap data on a printing sheet according to the set printing condition,
wherein the movement locus of the electronic pen defines one or more hand-written images, the intermediate data specifies an arrangement of one or more objects, and each object surrounds a respective one of the one or more hand-written images.

10. The data processing method of claim 9,
wherein the position information relating to the setting of the printing condition is position information of a position in an area allocated beforehand to the one hand-writing sheet,
in the first step, the image forming apparatus creates a table for associating one or more setting items disposed in the area of the one hand-writing sheet with position information of the setting items, and
in the third step, the electronic pen which has obtained the table from the image forming apparatus or the image forming apparatus picks out position information of a position in the area from the plurality of pieces of position information, refers to the table, identifies a setting item associated with the picked-out position information, and sets the printing condition according to the identified setting item.

11. The data processing method of claim 9,
wherein the position information relating to the setting of the printing condition is position information indicating a predetermined specific figure,
in the first step, the image forming apparatus creates a table for associating one or more setting items disposed on the hand-writing sheet with position information of the setting items, and
in the third step, the electronic pen which has obtained the table from the image forming apparatus or the image forming apparatus picks out position information indicating the predetermined specific figure from the plurality of pieces of position information, refers to the table, identifies a setting item associated with the picked-out position information, and sets the printing condition according to the identified setting item.

12. The data processing method of claim 9,
wherein the position information relating to the setting of the printing condition is position information indicating a predetermined specific character string, and
in the third step, the electronic pen or the image forming apparatus picks out position information indicating the predetermined specific character string from the plurality of pieces of position information, identifies a setting item which corresponds to the predetermined specific character string, and sets the printing condition according to the identified setting item.

13. The data processing method of claim 10,
wherein in the third step, when a plurality of setting items are identified, if printing conditions set according to the plurality of setting items are inconsistent, the electronic pen or the image forming apparatus makes only one setting item selected from the plurality of setting items effective, or a user is notified of an inappropriate setting of the printing conditions.

14. The data processing method of claim 9,
wherein in the fourth step, the image forming apparatus moves a position of the image or enlarges or reduces a size of the image so that the image based on the bitmap data can be printed at a center of the printing sheet.

15. An image forming apparatus capable of communicating with an electronic pen for detecting a position detection mark on a hand-writing sheet on which the position detection mark is printed, the image forming apparatus comprising:
a communication section for acquiring, from the electronic pen, electronic pen data including a plurality of pieces of position information obtained by the electronic pen detecting a position detection mark printed on one hand-writing sheet;
a language analysis section configured to create intermediate data based on a data type received by the language analysis section, wherein when the data type is electronic pen data, the language analysis section analyzes the electronic pen data, picks out position information relating to setting of a printing condition from the plurality of pieces of position information and sets the printing condition based on the picked-out position information, and transforms, into the intermediate data, information of a movement locus of the electronic pen specified by position information other than the position information relating to the setting of the printing condition;
an image processing section for rasterizing the intermediate data to create bitmap data; and
a printing section for printing an image based on the bitmap data on a printing sheet according to the set printing condition,
wherein the movement locus of the electronic pen defines one or more hand-written images, the intermediate data specifies an arrangement of one or more objects, and each object surrounds a respective one of the one or more hand-written images.

16. The image forming apparatus of claim 15,
wherein the position information relating to the setting of the printing condition is position information of a position in an area allocated beforehand to the one hand-writing sheet, the image forming apparatus further comprising:
a storage section for storing a table for associating one or more setting items disposed in the area of the one hand-writing sheet with position information of the setting items, and
wherein the language analysis section picks out position information of a position in the area from the plurality of pieces of position information, refers to the table, identifies a setting item associated with the picked-out position information, and sets the printing condition according to the identified setting item.

17. The image forming apparatus of claim 15,
wherein the position information relating to the setting of the printing condition is position information indicating a predetermined specific figure, the image forming apparatus comprising:
a storage section for storing a table for associating one or more setting items disposed on the one hand-writing sheet with position information of the setting items, and
the language analysis section picks out position information indicating the predetermined specific figure from the plurality of pieces of position information, refers to the table, identifies a setting item associated with the picked-out position information, and sets the printing condition according to the identified setting item.

18. The image forming apparatus of claim 15,
wherein the position information relating to the setting of the printing condition is position information indicating a predetermined specific character string, and
the language analysis section picks out position information indicating the predetermined specific character string from the plurality of pieces of position information, identifies a setting item which corresponds to the predetermined specific character string, and sets the printing condition according to the identified setting item.

19. The image forming apparatus of claim 16,
wherein when a plurality of setting items are identified and printing conditions set according to the plurality of setting items are inconsistent, the language analysis section makes only one setting item selected from the plurality of setting items effective, or notifies a user of an inappropriate setting of the printing conditions.

20. The image forming apparatus of claim 1,
wherein when the data type received by the language analysis section is printing data in the form of post script (PS), printer control language XL (PCLXL) or portable document format (PDF) data, the language analysis section analyzes the printing data and creates the intermediate data from the printing data, and
wherein when the data type received by the language analysis section is the electronic pen data, the language analysis section creates the intermediate data from a movement locus of the electronic pen, the movement locus being specified by position information other than position information relating to setting of printing condition among the plurality of pieces of position information which correspond to marks on one sheet of the hand-writing sheet.

21. The non-transitory computer-readable recording medium of claim 5,
wherein when the data type received by the language analysis section is printing data in the form of post script (PS), printer control language XL (PCLXL) or portable document format (PDF) data, the language analysis section analyzes the printing data and creates the intermediate data from the printing data, and
wherein when the data type received by the language analysis section is the electronic pen data, the language analysis section creates the intermediate data from a movement locus of the electronic pen, the movement locus being specified by position information other than position information relating to setting of printing condition among the plurality of pieces of position information which correspond to marks on one sheet of the hand-writing sheet.

22. The data processing method of claim 9, further comprising:
a fifth step of the image forming apparatus transforming, into intermediate data, printing data in the form of post script (PS), printer control language XL (PCLXL) or portable document format (PDF) data, rasterizing the intermediate data to create bitmap data, and printing an image based on the bitmap data on a printing sheet.

23. The image forming apparatus of claim 15,
wherein when the data type received by the language analysis section is printing data in the form of post script (PS), printer control language XL (PCLXL) or portable document format (PDF) data, the language analysis section analyzes the printing data and creates the intermediate data from the printing data.

* * * * *